(12) United States Patent
Connors et al.

(10) Patent No.: US 8,218,473 B2
(45) Date of Patent: Jul. 10, 2012

(54) WEB-BULK TRANSFER PREALLOCATION OF UPSTREAM RESOURCES IN A SATELLITE COMMUNICATION SYSTEM

(75) Inventors: Dennis Patrick Connors, San Diego, CA (US); Matthew John Freier, Carlsbad, CA (US); James Edward Deveau, Carlsbad, CA (US); Xiao Wu, Temecula, CA (US); Kristi Ann Jaska, Encinitas, CA (US)

(73) Assignee: ViaSat, Inc., Carlsbad, CA (US)

( * ) Notice: Subject to any disclaimer, the term of this patent is extended or adjusted under 35 U.S.C. 154(b) by 594 days.

(21) Appl. No.: 12/409,306

(22) Filed: Mar. 23, 2009

(65) Prior Publication Data

US 2009/0290533 A1    Nov. 26, 2009

(51) Int. Cl.
*H04B 7/185* (2006.01)
(52) U.S. Cl. ...................................................... 370/316
(58) Field of Classification Search ................... 370/316, 370/229, 230, 235, 392, 230.1, 412, 468, 370/395.2, 395.21, 395.4, 299; 455/427, 455/411, 461
See application file for complete search history.

(56) References Cited

U.S. PATENT DOCUMENTS

| | | | | |
|---|---|---|---|---|
| 4,736,371 A * | 4/1988 | Tejima et al. | ................. | 370/236 |
| 5,029,164 A * | 7/1991 | Goldstein et al. | ............. | 370/235 |
| 5,485,464 A | 1/1996 | Strodtbeck et al. | | |
| 5,825,325 A | 10/1998 | O'Donovan et al. | | |
| 5,907,541 A | 5/1999 | Fairholm et al. | | |
| 6,449,267 B1 | 9/2002 | Connors | | |
| 6,512,749 B1 | 1/2003 | Wright | | |
| 6,650,869 B2 * | 11/2003 | Kelly et al. | ................... | 455/13.2 |
| 6,690,645 B1 | 2/2004 | Aweya et al. | | |
| 6,707,916 B1 | 3/2004 | Caso et al. | | |
| 6,778,509 B1 | 8/2004 | Ravishankar et al. | | |
| 6,865,388 B2 | 3/2005 | Walsh et al. | | |
| 6,947,445 B1 * | 9/2005 | Barnhart | ....................... | 370/468 |
| 6,985,455 B1 | 1/2006 | Heath et al. | | |
| 7,010,265 B2 | 3/2006 | Coffin | | |
| 7,024,158 B2 | 4/2006 | Wiswell | | |
| 7,027,414 B2 * | 4/2006 | Walsh et al. | ................. | 370/316 |
| 7,319,666 B2 | 1/2008 | Goosman | | |
| 7,508,785 B2 | 3/2009 | Dale et al. | | |

(Continued)

FOREIGN PATENT DOCUMENTS

EP    1705838 A    9/2006

(Continued)

OTHER PUBLICATIONS

Atia, "Ka-Band Satellite System Architecture for Local Loop Internet Access," Microwave Symposium Digest, 2001 IEEE MTT-S Digest,International, Phoenix, AZ, (2001) vol. 2, pp. 1133-1136.

(Continued)

*Primary Examiner* — Chi Pham
*Assistant Examiner* — Alexander Boakye
(74) *Attorney, Agent, or Firm* — Kilpatrick Townsend & Stockton LLP

(57) ABSTRACT

In a data over satellite system, preallocation of upstream channel resources is provided by a scheduler at the gateway satellite modem termination system (SMTS) in response from the user terminal, wherein the user terminal detects web browser and/or bulk transfers involving large amounts of data transfer from users via the upstream channel. A type length value (TLV) field is included with data packets transmitted to the gateway SMTS, at which excess transfer capability is allocated to the user terminal in anticipation of load requirements.

21 Claims, 21 Drawing Sheets

U.S. PATENT DOCUMENTS

| | | | |
|---|---|---|---|
| 7,535,863 | B2 | 5/2009 | Gin et al. |
| 7,602,746 | B2 * | 10/2009 | Calhoun et al. ............... 370/328 |
| 2001/0053152 | A1 | 12/2001 | Sala et al. |
| 2002/0004369 | A1 | 1/2002 | Kelly et al. |
| 2002/0037734 | A1 | 3/2002 | McKenna et al. |
| 2002/0110094 | A1 | 8/2002 | Reddy |
| 2002/0187747 | A1 | 12/2002 | Sawdey et al. |
| 2003/0032391 | A1 | 2/2003 | Schweinhart et al. |
| 2003/0050008 | A1 | 3/2003 | Patterson et al. |
| 2003/0050060 | A1 | 3/2003 | Leslie et al. |
| 2003/0069034 | A1 | 4/2003 | Lee |
| 2003/0203733 | A1 | 10/2003 | Sharon |
| 2004/0014472 | A1 | 1/2004 | de La Chapelle et al. |
| 2004/0018849 | A1 | 1/2004 | Schiff |
| 2004/0162020 | A1 | 8/2004 | Dale et al. |
| 2004/0198218 | A1 | 10/2004 | Linsky et al. |
| 2005/0265376 | A1 | 12/2005 | Chapman et al. |

FOREIGN PATENT DOCUMENTS

| | | |
|---|---|---|
| WO | WO 00/52849 A | 9/2000 |
| WO | WO 2008/060756 A2 | 5/2008 |

OTHER PUBLICATIONS

Atia, et al., "Ka-Band Satellite System Architecture for Local Loop Internet Access," Fifth Ka Band Utilization Conference: Oct. 18-20, 1999, Taormina, Italy, (2000) Genova: Instituto Internationale Delle Comunicazioni.

Connors et al., "A Medium Access Control Protocol for Real Time Video Over High Latency Satellite Channels," Mobile Networks and Applications, ACM, New York, Jan. 1, 2002, pp. 9-20, ISSN: 1383-469X.

Connors et al., "Response Initiated Multiple Access (RIMA), A Medium Access Control Protocol for Satellite Channels," GLOBECOM'00 IEEE Global Telecommunications Conference, New York NY Nov. 27, 2000, pp. 1124-1129. ISBN: 978-0-7803-6452-3.

Elshabrawy, "MAC Architecture for Broadband Satellite Access Systems," Apr. 20, 2000, pp. III-100. [retrieved on May 29, 2008] Retrieved from the internet: <URL:http://users.enc.concordia.ca/{tahar/theses/Tallal-Thesis.pdf>.

Evans et al., "Providing Differentiated Service to TCP Flows Over Bandwidth on Demand Geostationary Satellite Networks," IEEE Journal on Selected Areas in Communications, vol. 22, No. 2, Feb. 1, 2004, pp. 333-347 ISSN: 0733-8716.

Le-Ngoc et al., "Performance Analysis of CFDAMA-PB Protocol for Packet Satellite Communications," IEEE Transactions on Communications, vol. 46, No. 9, Sep. 1998.

Mitchell et al., "Burst Targeted Demand Assignment Multiple-Access for Broadband Internet Service Delivery Over Geostationary Satellite," IEEE Journal on Selected Areas in Communications, vol. 22, No. 3, Apr. 2004, pp. 546-558. ISSN: 0733-8716.

Mitchell et al., "Improved Medium Access Control for Data Traffic Via Satellite Using the CFDAMA Protocol," IEE Seminar on Broadband Satellite: The Critical Success Factorstechnology, Services and Markets, pp. 18/01-18/07 XP001061698.

Ramirez et al., "Single-feed circularly polarized microstrip ring antenna and arrays," IEEE Transactions on Antennas and Propagation, vol. 48, No. 7, p. 1040-1047, Jul. 2000. [retrieved on Mar. 26, 2008]. Retrieved from the internet: <URL: http://www.ece.ucl.edu/rfmems/publications/papers/antenna/J009.pdf>.

Todorova et al., "Quality-of-Service-Oriented Media Access Control for Advanced Mobile Multimedia Satellite Systems," Systems Sciences, 2003. Proceedings of the 36th Hawaii International Conference on System Sciences, Jan. 6-9 2003, pp. 309-316. ISBN: 978-0-7695-1874-9.

International Search Report and Written Opinion PCT/US2007/079563 dated Jun. 5, 2008.

Bambos, N., et al., "Globally Constrained Power Control Across Multiple Channels in Wireless Data Networks", Mobile Networks and Applications, Sep. 2001, vol. 6, pp. 427-434.

Bhatia, S., et al., "Empirical Evaluation of Upstream Throughput in a DOCSIS Access Network", 2005, 1st International Conference on Multimedia Services Access Networks, Jun. 13-15, 2005, 8 pages.

Hindin, E., "Saywhat?," Network World, Aug. 17, 1998, vol. 37, 8 pages.

Xiao, Y., "Efficient MAC Strategies for the IEEE 802.11n Wireless LANs", Wireless Communications and Mobile Computing, 2006, vol. 6, pp. 453-466.

Xiao, Y., "IEEE 802.11 Performance Enhancement via Concatenation and Piggyback Mechanisms", IEEE Transactions on Wireless Communications, Sep. 2005, vol. 4, No. 5, pp. 2182-2192.

Office Action Pursuant to Art. 94(3) EPC, dated May 20, 2010, 8 pages total.

Communication pursuant to Article 94(3) EPC from European Patent Office, corresponding to the Application No. 07 868 342.2, dated Mar. 31, 2011, 4 pages total.

Satellite One, "Spot Beam Technology," [online], [retrieved on Mar. 6, 2009]. Retrieved from the Internet <URL: http//www.satelliteone.com/dish/support/Spot_Beam_Short.pdf>.

* cited by examiner

Action A:
1. Set application to BULK
2. Set paQuanta to paQuanta$_{BULK}$
3. Set paMultiplier to zero Action B:
1. Set application to WEB
2. Set paQuanta to paQuanta$_{BULK}$
3. Set paMultiplier to one Action C:
1. Set application to BULK
2. Set paQuanta to zero
3. Set paMultiplier to zero

WEB-BULK TRANSFER PREALLOCATION OF UPSTREAM RESOURCES IN A SATELLITE COMMUNICATION SYSTEM

CROSS-REFERENCE TO RELATED APPLICATIONS

This application is a continuation application of International Application Number PCT/US2007/079563 filed Sep. 26, 2007, which claimed benefit of provisional Patent Application Ser. No. 60/828,044, filed Oct. 3, 2006. This application expressly incorporates by reference each of the following patent applications in their entirety for all purposes:

- U.S. Provisional Patent Application No. 60/828,044, filed Oct. 3, 2006 for "Web/Bulk Transfer Preallocation Of Upstream Resources In A Satellite Communication System";
- PCT Application Serial No. PCT/US07/79577, filed Sep. 26, 2007 on the same date as the parent PCT application, entitled "Improved Spot Beam Satellite Ground Systems";
- PCT Application Serial No. PCT/US2007/079561, filed Sep. 26, 2007 on the same date as the parent PCT application, entitled "Multi-Service Provider Subscriber Authentication";
- PCT Application Serial No. PCT/US2007/079565, filed Sep. 26, 2007 on the same date as the parent PCT application, entitled "Large Packet Concatenation In Satellite Communication System";
- PCT Application Serial No. PCT/US2007/79569, filed Sep. 26, 2007 on the same date as the present PCT application, entitled "Upfront Delayed Concatenation In Satellite Communication System";
- PCT Application Serial No. PCT/US07/79571, filed Sep. 26, 2007 on the same date as the parent PCT application, entitled "Map-Trigger Dump of Packets in Satellite Communication System";
- PCT Application Serial No. PCT/US07/079567, filed Sep. 26, 2007 on the same date as the parent PCT application, entitled "Improved Spot Beam Satellite Systems";
- PCT Application Serial No. PCT/US07/79517, filed Sep. 26, 2007 on the same date as the parent PCT application, entitled "Downstream Waveform Sub-Channelization For Satellite Communications";
- PCT Application Serial No. PCT/US07/79523, filed Sep. 26, 2007 on the same date as the parent PCT application, entitled "Packet Reformatting For Downstream Links"; and
- PCT Application Serial No. PCT/US07/79541, filed Sep. 26, 2007 on the same date as the parent PCT application, entitled "Upstream Resource Allocation For Satellite Communications"
- U.S. Continuation in Part patent application Ser. No. 11/538,431, filed Oct. 3, 2006 for "Code Reuse Multiple Access For A Satellite Return Link";
- U.S. Continuation in Part patent application Ser. No. 11/538,429, filed Oct. 3, 2006 for "Method For Congestion Management";

FIELD OF THE INVENTION

The present invention relates to wireless communications in general and, in particular, to a satellite communications network.

BACKGROUND OF THE INVENTION

Consumer broadband satellite services are gaining traction in North America with the start up of star network services using Ka band satellites. While such first generation satellite systems may provide multi-gigabit per second (Gbps) per satellite overall capacity, the design of such systems inherently limits the number of customers that may be adequately served. Moreover, the fact that the capacity is split across numerous coverage areas further limits the bandwidth to each subscriber.

While existing designs have a number of capacity limitations, the demand for such broadband services continues to grow. The past few years have seen strong advances in communications and processing technology. This technology, in conjunction with selected innovative system and component design, may be harnessed to produce a novel satellite communications system to address this demand.

DAMA Basics

A DAMA user SM is operative to transmit a request to the DAMA scheduler at the gateway, or SMTS, requesting upstream bandwidth sufficient to transmit the packet that is in its output queue. Ignoring the contention delay (i.e. the delay to contend for, possibly collide in, and finally successfully transmit in the contention channel), the arriving packet must wait a handshake interval until bandwidth is assigned. The handshake interval is the round trip time between the terminal and the central controller (in our case the SMTS), denoted RTT. The terminal will then transmit the packet and, ignoring the transmit time, the packet will arrive at the central controller one half an RTT later. This process implies that all packets arriving to an empty output queue will experience a delay of 1.5×RTT, not counting the contention delay. This delay of 1.5×RTT is an irreducible lower bound.

Because packets that arrive to a non empty queue must wait until they move to the head of the queue, these packets will experience a total delay greater than 1.5×RTT. Their delay is their wait time plus 1.5×RTT. The DAMA scheduler attempts to minimize the wait time of packets that arrive to a non-empty queue.

DOCSIS Best Effort DAMA (BE-DAMA) is pure DAMA with the sole exception that requests for bandwidth can be piggybacked on transmitted data packets so as to take some of the loading off the contention channel, and hence increase overall system capacity. This means that a burst of packets arriving to a DOCSIS cable modem (CM) will have only one contention delay for the entire burst. The piggybacked request mechanism limits the request to just describe the packet in position 1 in the output queue (the packet being transmitted occupies position 0 in the output queue). This implies that the first packet of a burst (p0) will have a delay of 1.5×RTT, packet 1 will have a delay of up to 2.5×RTT, packet 2 will have a delay of up to 3.5×RTT, and so on.

A Demand Assigned Multiple Access (DAMA) scheduler is useful for relieving some of the load in a channel subject to contention. The goal of a DAMA scheduler in this instance is to reduce the number of assigned-but-unused minislots on the upstream channel (i.e. improve scheduling efficiency) without degrading webpage-download or FTP upload performance which uses the downstream channels. The ultimate goal is to provide more available upstream bandwidth to support more subscribers per upstream. By the nature of burst transmission of packets, a burst of packets can have only one contention delay for the entire burst. However, DAMA produces collisions in the contention channel since the arrival of packets is not deterministic, thus producing undesired latency and inefficiency in channel usage. To improve efficiency, what is needed is a mechanism to reduce the wait time. DAMA is a potential tool in a mechanism to this end.

CONCISE EXPLANATION OF THE INVENTION

According to the invention, in a data over satellite system, preallocation of upstream channel resources is provided by a scheduler at the gateway satellite modem termination system (SMTS) in response from the user terminal, wherein the user terminal detects web browser and/or bulk transfers involving large amounts of data transfer from users via the upstream channel. A type length value (TLV) field is included with data packets transmitted to the gateway SMTS, at which excess transfer capability is allocated to the user terminal in anticipation of load requirements.

The invention will be better understood by reference to the following detailed description and accompanying drawings.

DETAILED DESCRIPTION OF THE INVENTION

Various embodiments of the present invention comprise systems, methods, devices, and software for a novel broadband satellite network. This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, a number of steps may be required before, after, or concurrently with the following embodiments.

It should also be appreciated that the following systems, methods, devices, and software may be a component of a larger system, wherein other procedures may take precedence over or otherwise modify their application.

Figure 1A:
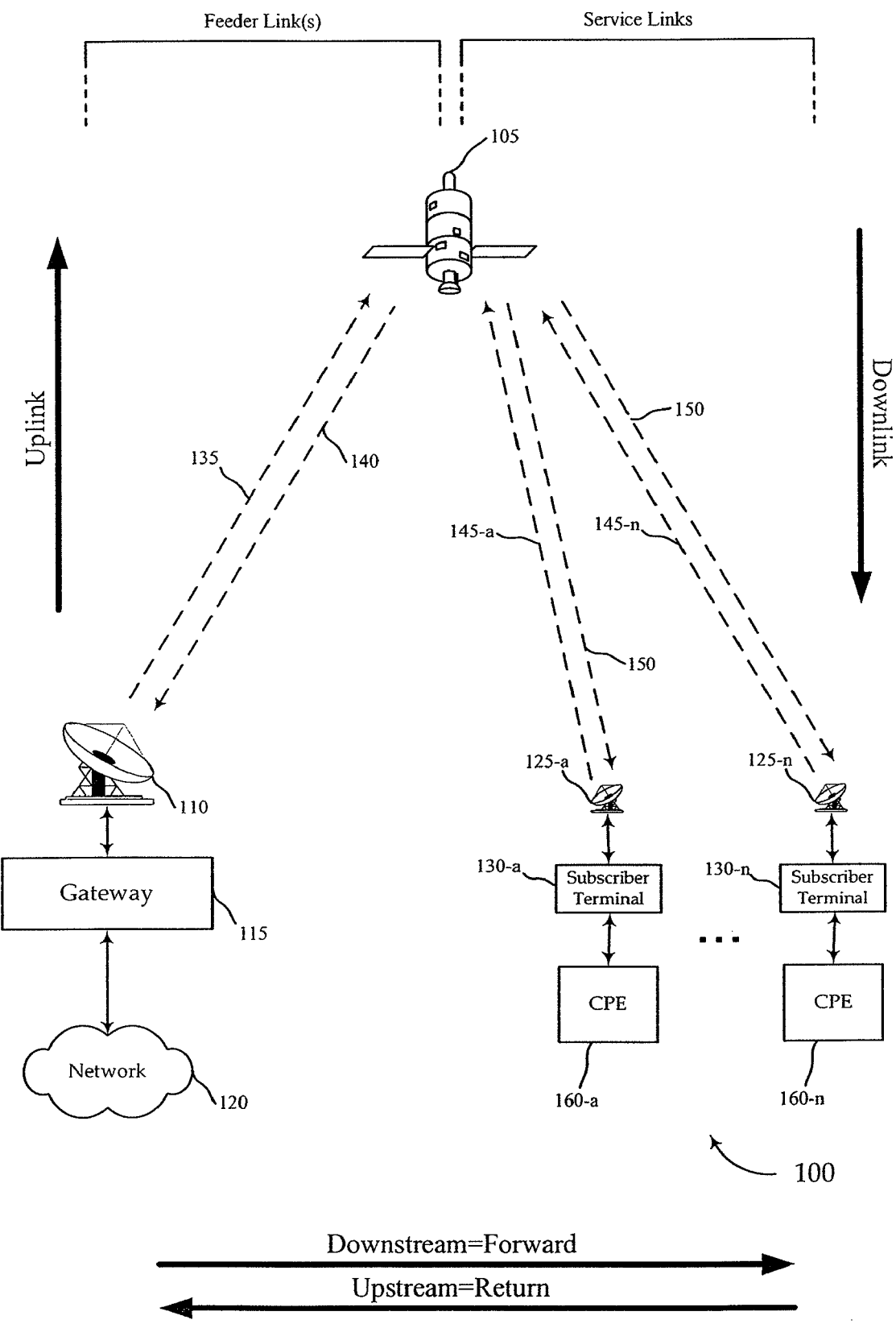
FIGS. 1A and 1B are block diagrams of a satellite communication system

FIG. 1A is a block diagram of an exemplary satellite communications system 100 configured according to various embodiments of the invention. The satellite communications system 100 includes a network 120, such as the Internet, interfaced with a gateway 115 that is configured to communicate with one or more subscriber terminals 130, via a satellite 105. A gateway 115 is sometimes referred to as a hub or ground station. Subscriber terminals 130 are sometimes called modems, satellite modems or user terminals. As noted above, although the communications system 100 is illustrated as a geostationary satellite 105 based communication system, it should be noted that various embodiments described herein are not limited to use in geostationary satellite based systems, for example some embodiments could be low earth orbit (LEO) satellite based systems.

The network 120 may be any type of network and can include, for example, the Internet, an IP network, an intranet, a wide-area network ("WAN"), a local-area network ("LAN"), a virtual private network, the Public Switched Telephone Network ("PSTN"), and/or any other type of network supporting data communication between devices described herein, in different embodiments. A network 120 may include both wired and wireless connections, including optical links. Many other examples are possible and apparent to those skilled in the art in light of this disclosure. As illustrated in a number of embodiments, the network may connect the gateway 115 with other gateways (not pictured), which are also in communication with the satellite 105.

The gateway 115 provides an interface between the network 120 and the satellite 105. The gateway 115 may be configured to receive data and information directed to one or more subscriber terminals 130, and can format the data and information for delivery to the respective destination device via the satellite 105. Similarly, the gateway 115 may be configured to receive signals from the satellite 105 (e.g., from one or more subscriber terminals) directed to a destination in the network 120, and can format the received signals for transmission along the network 120.

A device (not shown) connected to the network 120 may communicate with one or more subscriber terminals, and through the gateway 115. Data and information, for example IP datagrams, may be sent from a device in the network 120 to the gateway 115. The gateway 115 may format a Medium Access Control (MAC) frame in accordance with a physical layer definition for transmission to the satellite 130. A variety of physical layer transmission modulation and coding techniques may be used with certain embodiments of the invention, including those defined with the DVB-S2 and WiMAX standards. The link 135 from the gateway 115 to the satellite 105 may be referred to as hereinafter as the downstream uplink 135.

The gateway 115 may use an antenna 110 to transmit the signal to the satellite 105. In one embodiment, the antenna 110 comprises a parabolic reflector with high directivity in the direction of the satellite and low directivity in other directions. The antenna 110 may comprise a variety of alternative configurations and include operating features such as high isolation between orthogonal polarizations, high efficiency in the operational frequency bands, and low noise.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception of such signals. The satellite 105 may process the signals received from the gateway 115 and forward the signal from the gateway 115 containing the MAC frame to one or more subscriber terminals 130. In one embodiment, the satellite 105 operates in a multi-beam mode, transmitting a number of narrow beams each directed at a different region of the earth, allowing for frequency re-use. With such a multibeam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments a number of configurations are possible (e.g., using LEO satellites, or using a mesh network instead of a star network), as evident to those skilled in the art.

The service signals transmitted from the satellite 105 may be received by one or more subscriber terminals 130, via the respective subscriber antenna 125. In one embodiment, the antenna 125 and terminal 130 together comprise a very small aperture terminal (VSAT), with the antenna 125 measuring approximately 0.6 meters in diameter and having approximately 2 watts of power. In other embodiments, a variety of other types of antennas 125 may be used at the subscriber terminal 130 to receive the signal from the satellite 105. The link 150 from the satellite 105 to the subscriber terminals 130 may be referred to hereinafter as the downstream downlink 150. Each of the subscriber terminals 130 may comprise a single user terminal or, alternatively, comprise a hub or router (not pictured) that is coupled to multiple user terminals. Each subscriber terminal 130 may be connected to consumer premises equipment (CPE) 160 comprising, for example computers, local area networks, Internet appliances, wireless networks, etc.

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time Division Multiple Access (TDMA) scheme is also employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as Frequency Division Multiple Access (FDMA), Orthogonal Frequency Division Multiple Access (OFDMA), Code Division Multiple Access (CDMA), or any number of hybrid or other schemes known in the art.

A subscriber terminal, for example 130-a, may transmit data and information to a network 120 destination via the satellite 105. The subscriber terminal 130 transmits the signals via the upstream uplink 145-a to the satellite 105 using the antenna 125-a. A subscriber terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The link from the satellite 105 to the gateway 115 may be referred to hereinafter as the upstream downlink 140.

Figure 1B:
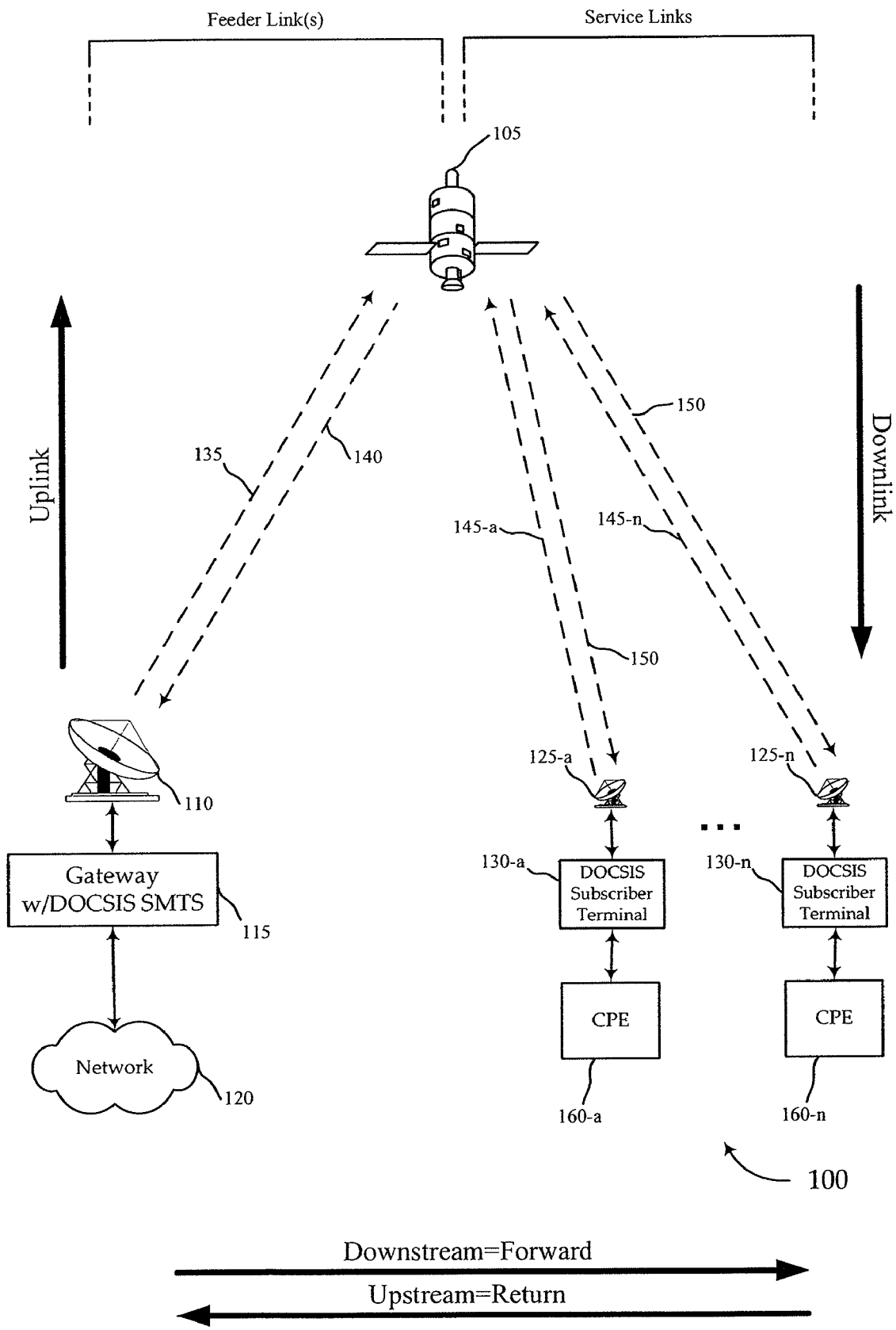

Turning to FIG. 1B, a block diagram is shown illustrating an alternative embodiment of a satellite communication system 100. This communication system 100 may, for example, comprise the system 100 of FIG. 1A, but is in this instance described with greater particularity. In this embodiment, the gateway 115 includes a Satellite Modem Termination System (SMTS), which is based at least in part on the Data-Over-Cable Service Interface Standard (DOCSIS). The SMTS in this embodiment includes a bank of modulators and demodulators for transmitting signals to and receiving signals from subscriber terminals 130. The SMTS in the gateway 115 performs the real-time scheduling of the signal traffic through the satellite 105, and provides the interfaces for the connection to the network 120.

In this embodiment, the subscriber terminals 135 use portions of DOCSIS-based modem circuitry, as well. Therefore, DOCSIS-based resource management, protocols, and schedulers may be used by the SMTS for efficient provisioning of messages. DOCSIS-based components may be modified, in various embodiments, to be adapted for use therein. Thus, certain embodiments may utilize certain parts of the DOCSIS specifications, while customizing others.

While a satellite communications system 100 applicable to various embodiments of the invention is broadly set forth above, a particular embodiment of such a system 100 will now be described. In this particular example, approximately 2 Gigahertz (GHz) of bandwidth is to be used, comprising four 500 Megahertz (MHz) bands of contiguous spectrum. Employment of dual-circular polarization results in usable frequency comprising eight 500 MHz non-overlapping bands with 4 GHz of total usable bandwidth. This particular embodiment employs a multi-beam satellite 105 with physical separation between the gateways 115 and subscriber spot beams, and configured to permit reuse of the frequency on the various links 135, 140, 145, 150. A single Traveling Wave Tube Amplifier (TWTA) is used for each service link spot beam on the downstream downlink, and each TWTA is operated at full saturation for maximum efficiency. A single wideband carrier signal, for example using one of the 500 MHz bands of frequency in its entirety, fills the entire bandwidth of the TWTA, thus allowing a minimum number of space hardware elements. Spotbeam size and TWTA power may be optimized to achieve maximum flux density on the earth's surface of −118 decibel-watts per meter squared per Megahertz ($dbW/m^2/MHz$). Thus, using approximately 2 bits per second per hertz (bits/s/Hz), there is approximately 1 Gbps of available bandwidth per spot beam.

Figure 12A:
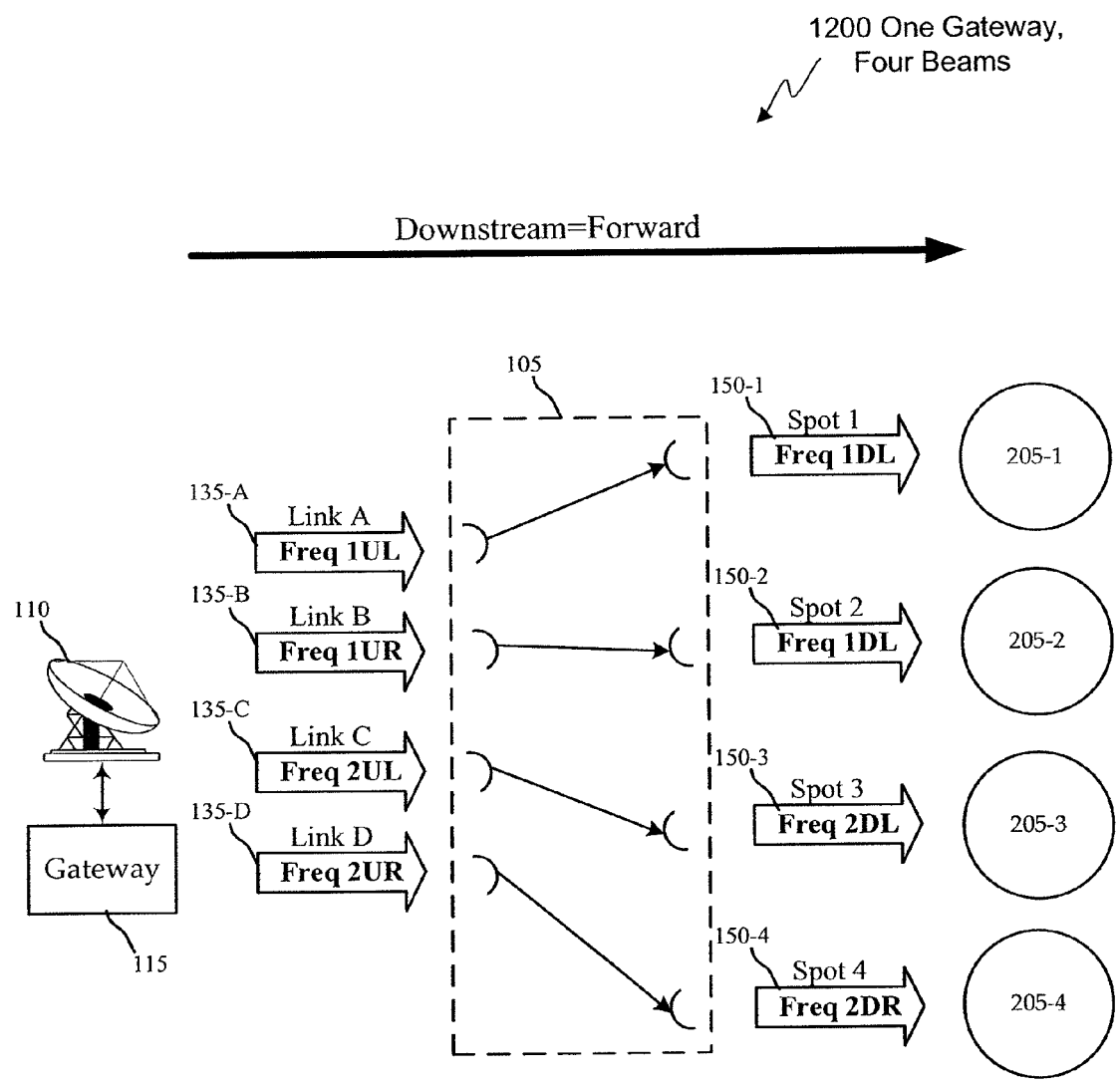
FIGS. 12A and 12B are diagrams illustrating frequency allocation of a gateway.

With reference to FIG. 12A, an embodiment of a forward link distribution system 1200 is shown. The gateway 115 is shown coupled to an antenna 110, which generates four downstream signals. A single carrier with 500 MHz of spectrum is used for each of the four downstream uplinks 135. In this embodiment, a total of two-frequencies and two polarizations allow four separate downstream uplinks 135 while using only 1 GHz of the spectrum. For example, link A 135-A could be Freq 1U (27.5-28.0 GHz) with left-hand polarization, link B 135-B could be Freq 1U (27.5-28.0) GHz with right-hand polarization, link C could be Freq 2U (29.5-30 GHz) with left-hand polarization, and link D could be Freq 2U (29.5-30 GHz) with left-hand polarization.

The satellite 105 is functionally depicted as four "bent pipe" connections between a feeder and service link. Carrier signals can be changed through the satellite 105 "bent pipe" connections along with the orientation of polarization. The satellite 105 converts each downstream uplink 135 signal into a downstream downlink signal 150.

In this embodiment, there are four downstream downlinks 150 that each provides a service link for four spot beams 205. The downstream downlink 150 may change frequency in the bent pipe as is the case in this embodiment. For example, downstream uplink A 135-A changes from a first frequency (i.e., Freq 1U) to a second frequency (i.e., Freq 1D) through the satellite 105. Other embodiments may also change polarization between the uplink and downlink for a given downstream channel. Some embodiments may use the same polarization and/or frequency for both the uplink and downlink for a given downstream channel.

Figure 12B:
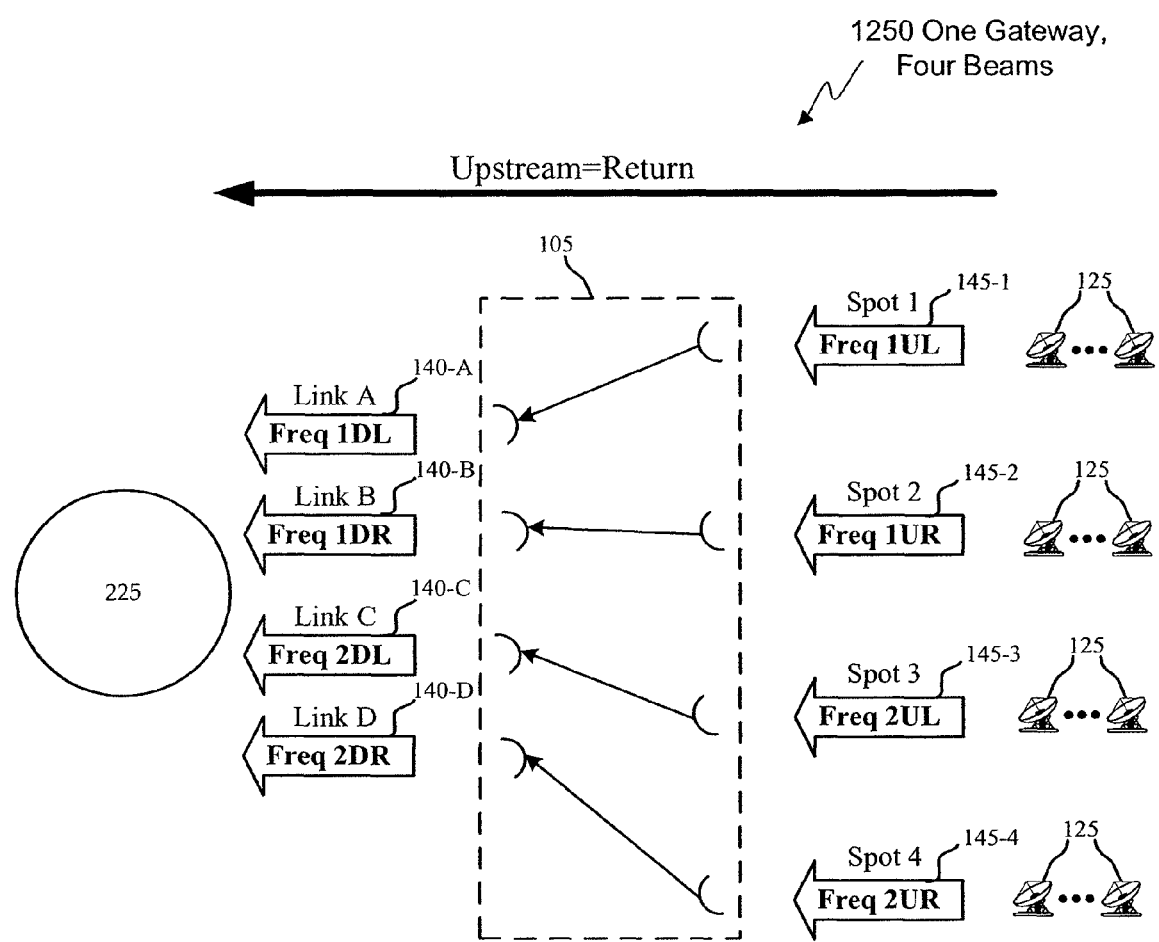

Referring next to FIG. 12B, an embodiment of a return link distribution system is shown. This embodiment shows four upstream uplinks 145 from four sets of subscriber terminals 125. A "bent pipe" satellite 105 takes the upstream uplinks 145, optionally changes carrier frequency and/or polarization (not shown), and then redirects them as upstream downlinks 140 to a spot beam for a gateway 115. In this embodiment, the carrier frequency changes between the uplink 145 and the downlink 140, but the polarization remains the same. Because the feeder spot beams to the gateway 115 is not in the coverage area of the service beams, the same frequency pairs may be reused for both service links and feeder links.

Figure 2A:
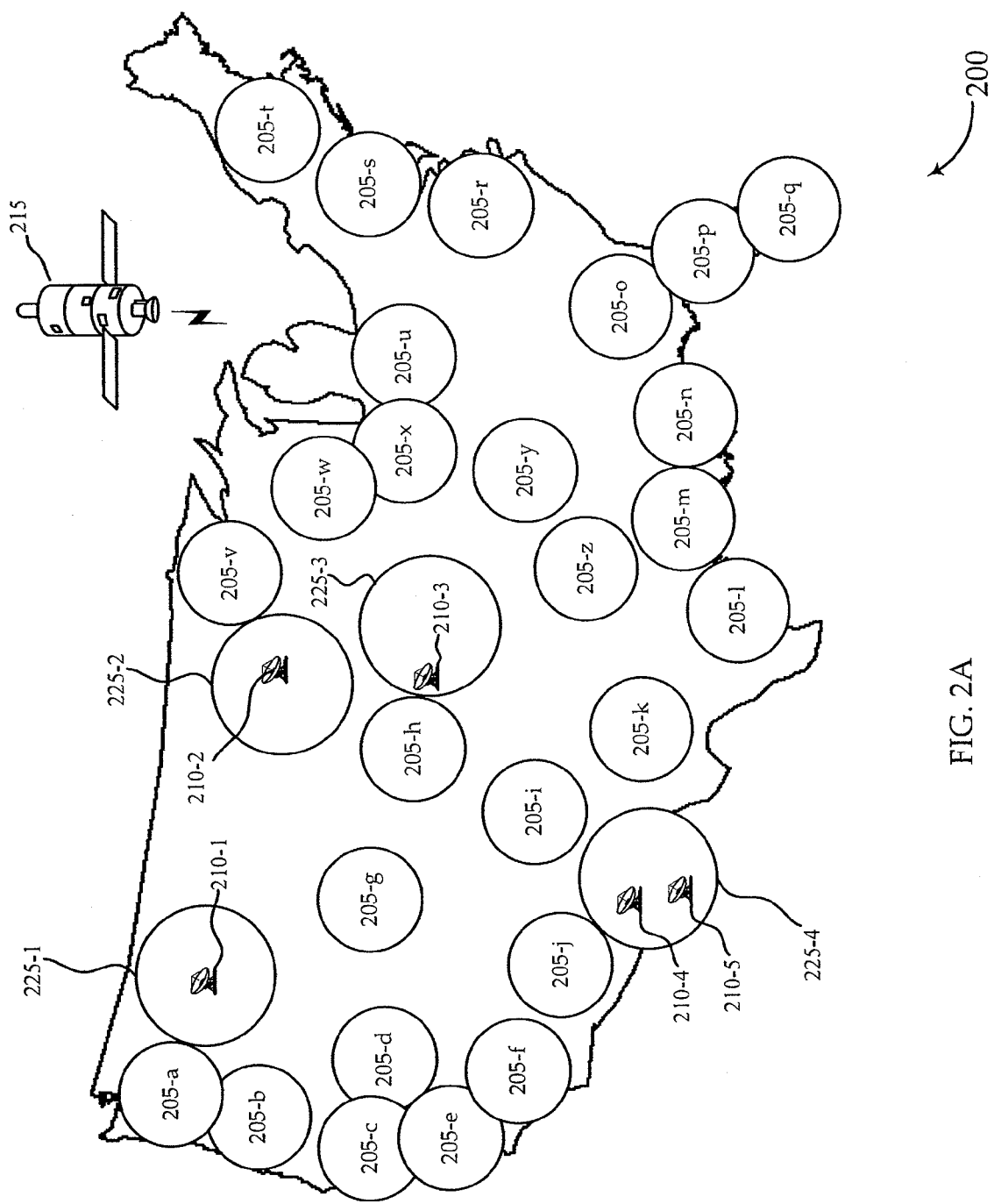
FIGS. 2A and 2B are maps showing geographical distributions of beams.
Figure 2B:
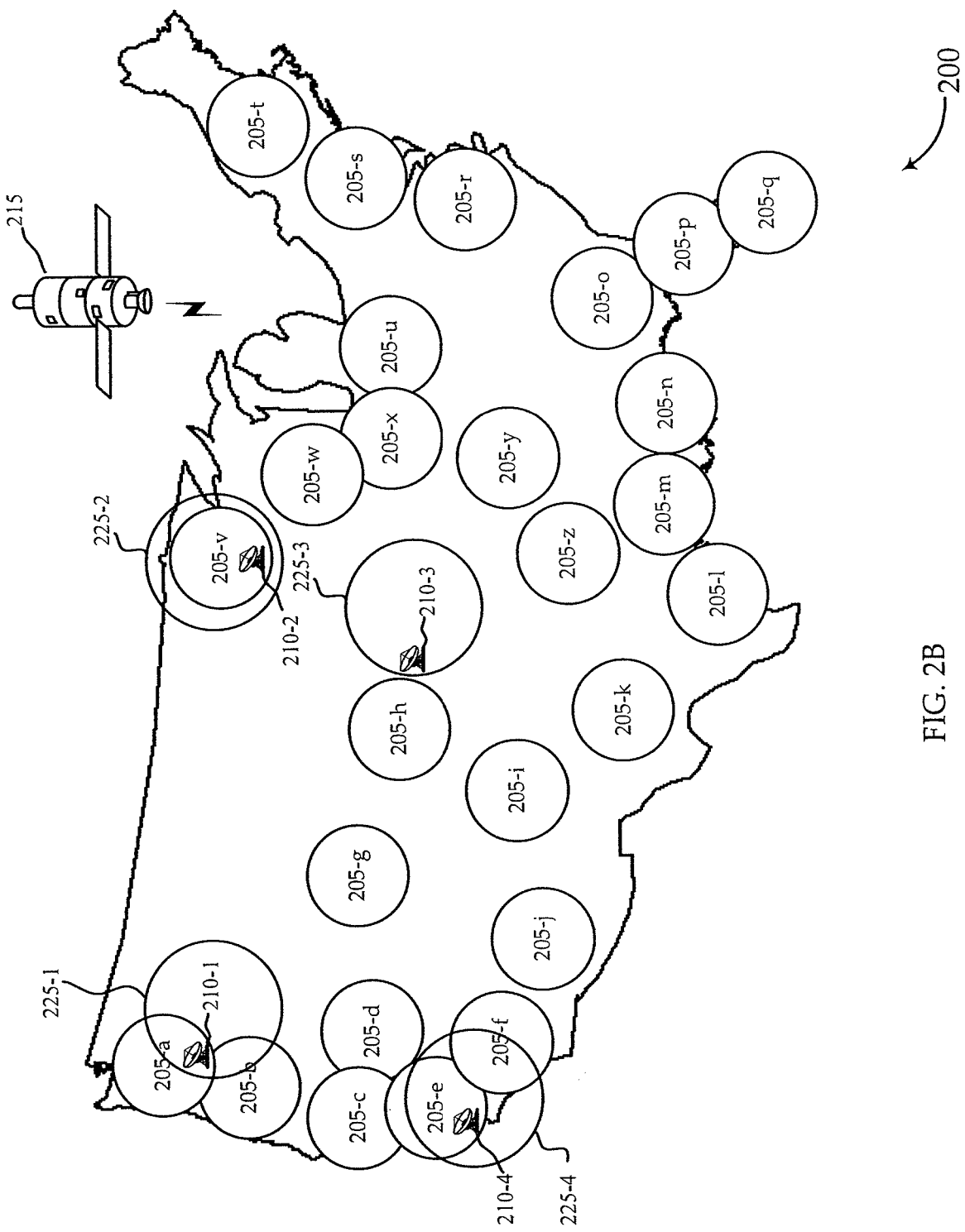

Turning to FIGS. 2A and 2B, examples of a multi-beam system 200 configured according to various embodiments of the invention are shown. The multi-beam system 200 may, for example, be implemented in the network 100 described in FIGS. 1A and 1B. Shown are the coverage of a number of feeder and service spot beam regions 225, 205. In this embodiment, a satellite 215 reuses frequency bands by isolating antenna directivity to certain regions of a country (e.g., United States, Canada or Brazil). As shown in FIG. 2A, there is complete geographic exclusivity between the feeder and service spot beams 205, 225. But that is not the case for FIG. 2B where there may in some instances be service spot beam overlap (e.g., 205-c, 205-d, 205-e), while there is no overlap in other areas. However, with overlap, there are certain interference issues that may inhibit frequency band re-use in the overlapping regions. A four color pattern allows avoiding interference even where there is some overlap between neighboring service beams 205.

In this embodiment, the gateway terminals 210 are also shown along with their feeder beams 225. As shown in FIG. 2B, the gateway terminals 210 may be located in a region covered by a service spotbeam (e.g., the first, second and fourth gateways 210-1, 210-2, 210-4). However, a gateway may also be located outside of a region covered by a service spotbeam (e.g., the third gateway 210-3). By locating gateway terminals 210 outside of the service spotbeam regions (e.g., the third gateway 210-3), geographic separation is achieved to allow for re-use of the allocated frequencies.

There are often spare gateway terminals 210 in a given feeder spot beam 225. The spare gateway terminal 210-5 can substitute for the primary gateway terminal 210-4 should the primary gateway terminal 210-4 fail to function properly. Additionally, the spare can be used when the primary is impaired by weather.

Figure 8:
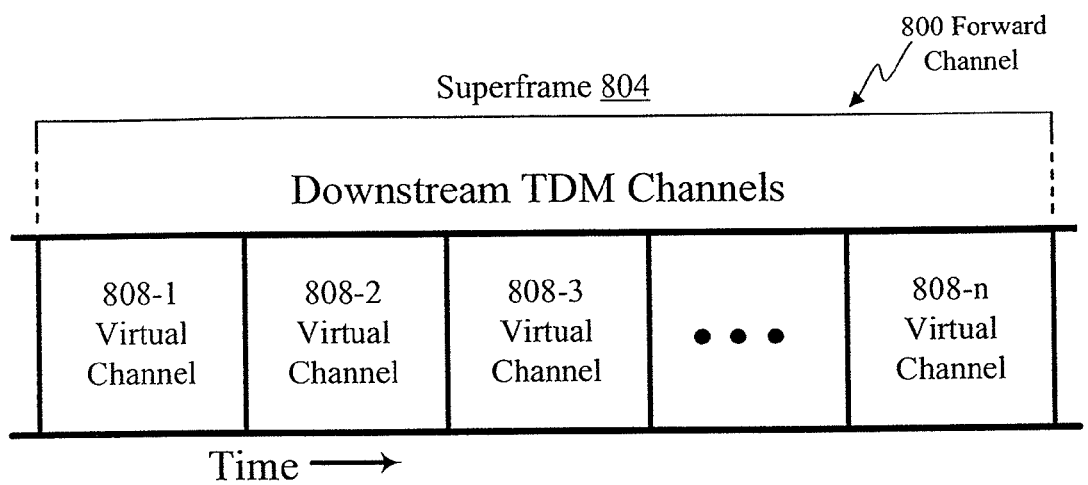
FIG. 8 is a timing diagram of a forward channel superframe.

Referring next to FIG. 8, an embodiment of a downstream channel 800 is shown. The downstream channel 800 includes a series of superframes 804 in succession, where each superframe 804 may have the same size or may vary in size. This embodiment divides a superframe 804 into a number of virtual channels 808(1-n). The virtual channels 808(1-n) in each superframe 804 can be the same size or different sizes. The size of the virtual channels 808(1-n) can change between different superframes 804. Different coding can be optionally used for the various virtual channels 808 (1-n). In some embodiments, the virtual channels are as short as one symbol in duration.

Figure 9:
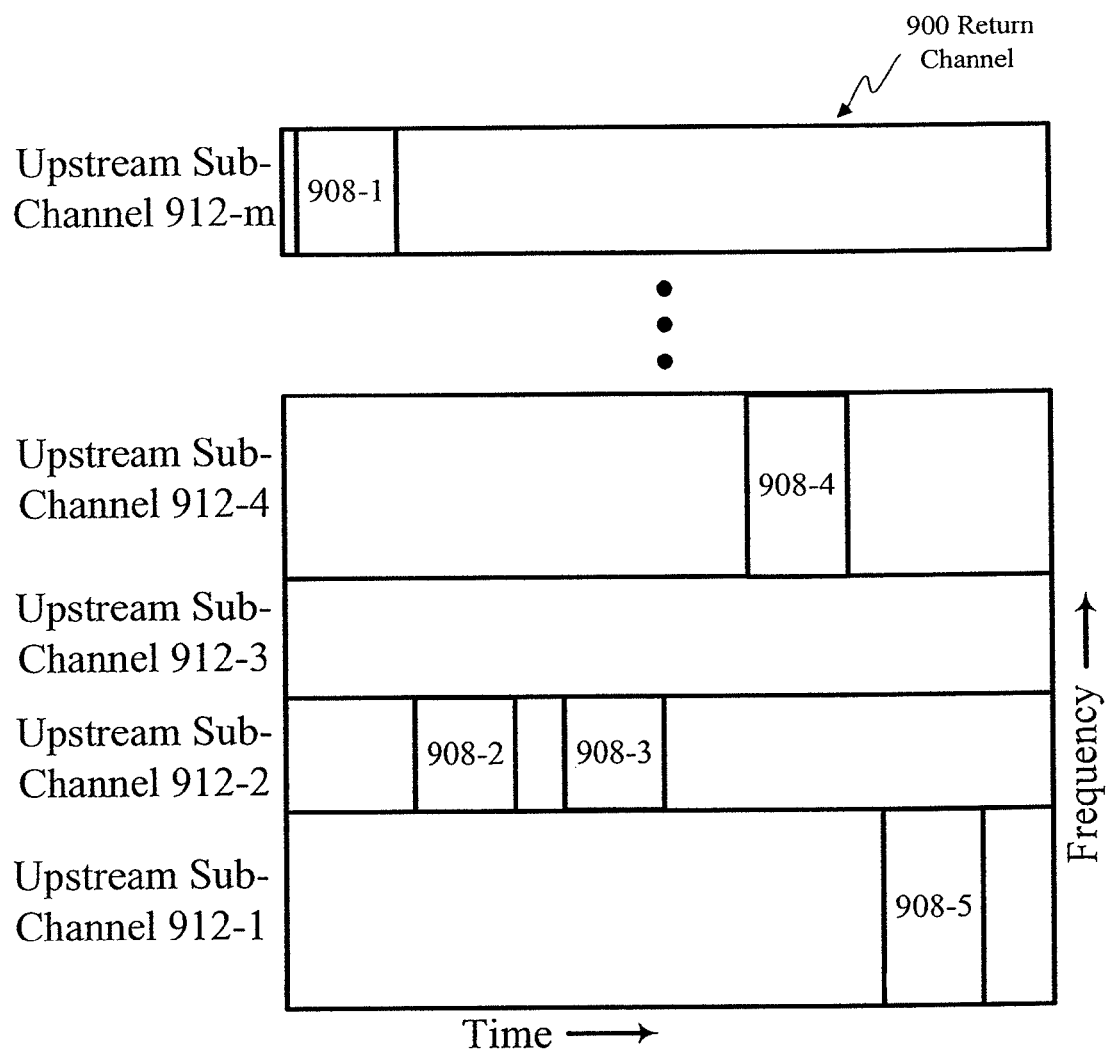
FIG. 9 is a timing diagram of a typical return channel superframe.

With reference to FIG. 9, an embodiment of an upstream channel 900 is shown. This embodiment uses MF-TDMA, but other embodiments can use CDMA, OFDM, or other access schemes. The upstream channel 900 has 500 MHz of total bandwidth in one embodiment. The total bandwidth is divided into m frequency sub-channels, which may differ in bandwidth, modulation, coding, etc. and may also vary in time based on system needs.

In this embodiment, each subscriber terminal 130 is given a two-dimensional (2D) map to use for its upstream traffic. The 2D map has a number of entries where each indicates a frequency sub-channel 912 and time segment 908(1-5). For example, one subscriber terminal 130 is allocated sub-channel m 912-m, time segment one 908-1; sub-channel two 912-2, time segment two 908-2; sub-channel two 912-2, time segment three 908-3; etc. The 2D map is dynamically adjusted for each subscriber terminal 130 according to anticipated need by a scheduler in the SMTS.

Figure 13:
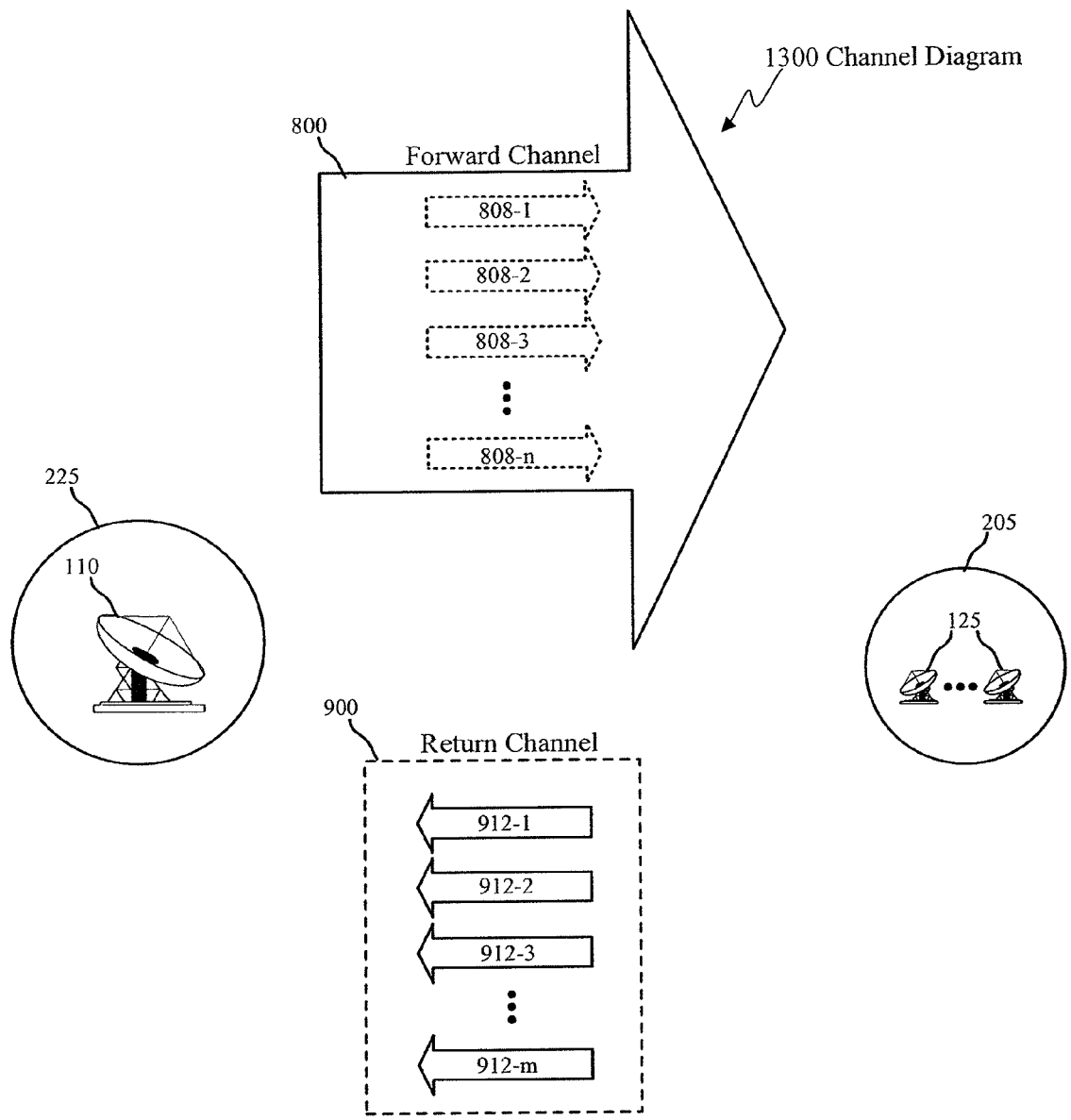
FIG. 13 is a block diagram of a forward channel and return channels in a relay satellite.

Referring to FIG. 13, an embodiment of a channel diagram is shown. Only the channels for a single feeder spot beam 225 and a single service spot beam 205 are shown, but embodiments include many of each spot beam 225, 205 (e.g., various embodiments could have 60, 80, 100, 120, etc. of each type of spot beam 225, 205). The forward channel 800 includes n virtual channels 808 traveling from the gateway antenna 110 to the service spot beam 205. Each subscriber terminal 130 may be allocated one or more of the virtual channels 808. m MF-TDMA channels 912 make up the return channel 900 between the subscriber terminal (ST) antennas 125 and the feeder spot beam 225.

Figure 3:
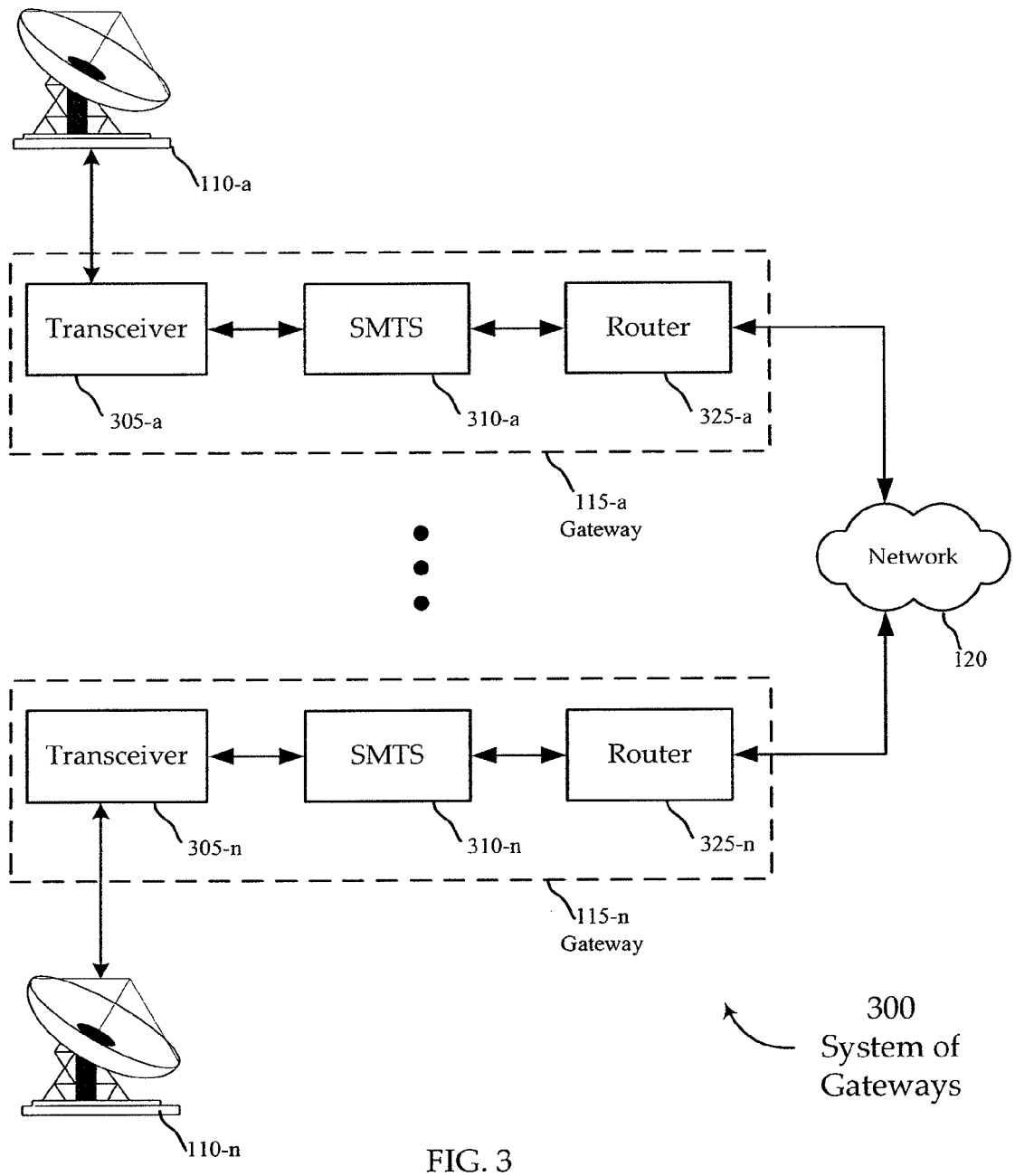
FIG. 3 is a block diagram of a gateway system.

Referring next to FIG. 3, an embodiment of a ground system 300 of gateways 115 is shown in block diagram form. One embodiment could have fifteen active gateways 115 (and possibly spares) to generate sixty service spot beams, for example. The ground system 300 includes a number of gateways 115 respectively coupled to antennas 110. All the gateways 115 are coupled to a network 120 such as the Internet. The network is used to gather information for the subscriber terminals. Additionally, each SMTS communicates with other SMTS and the Internet using the network 120 or other means not shown.

Each gateway 115 includes a transceiver 305, a SMTS 310 and a router 325. The transceiver 305 includes both a transmitter and a receiver. In this embodiment, the transmitter takes a baseband signal and upconverts and amplifies the baseband signal for transmission of the downstream uplinks 135 with the antenna 110. The receiver downconverts and tunes the upstream downlinks 140 along with other processing as explained below. The SMTS 310 processes signals to allow the subscriber terminals to request and receive information and schedules bandwidth for the forward and return channels 800, 900. Additionally, the SMTS 310 provides configuration information and receives status from the subscriber terminals 130. Any requested or returned information is forwarded via the router 325.

Figure 11:
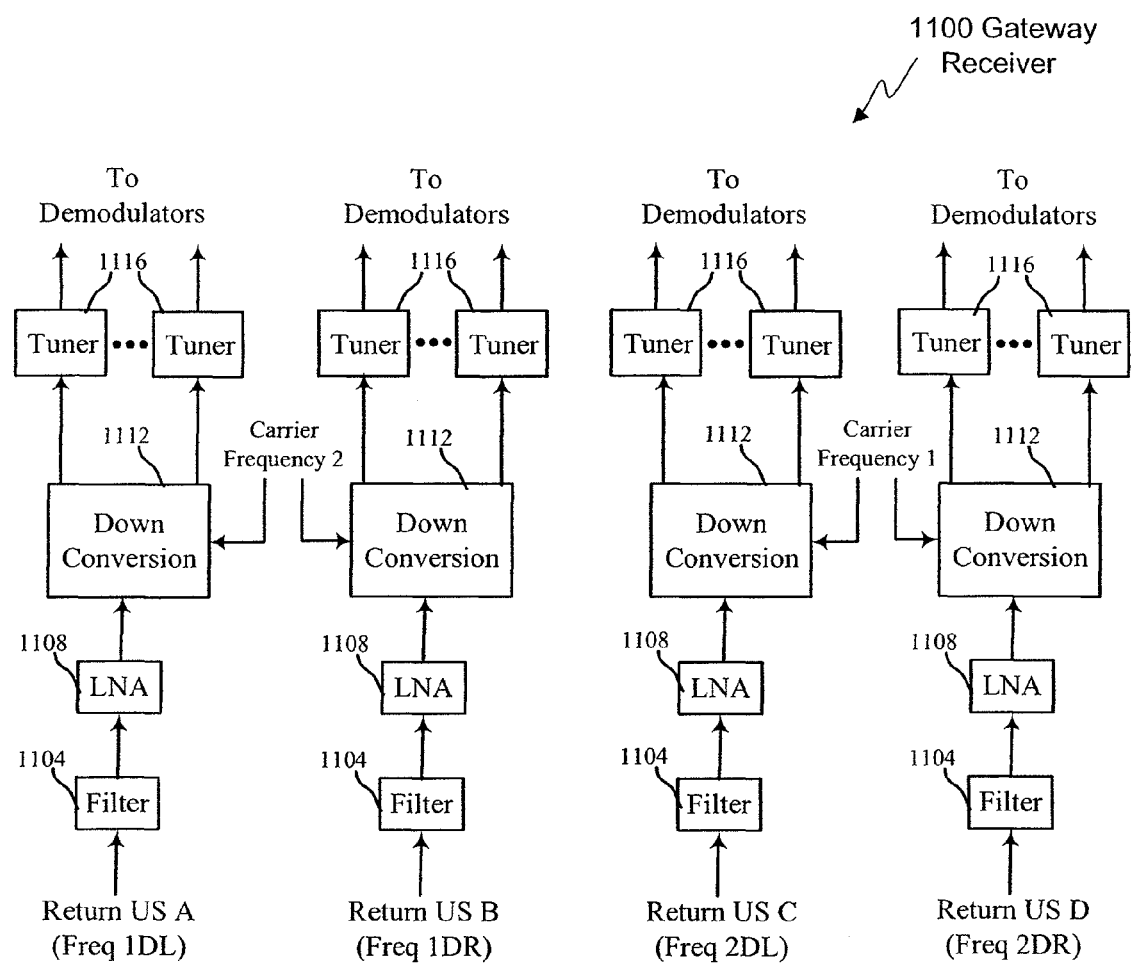
FIG. 11 is a block diagram of a gateway receiver.

With reference to FIG. 11, an embodiment of gateway receiver 1100 is shown. This embodiment of the receiver 1100 processes four return channels 900 from four different service spot beams 205. The return channels 900 may be divided among four pathways using antenna polarization and/or filtering 1104. Each return channel is coupled to a low-noise amplifier (LNA) 1108. Down conversion 1112 mixes down the signal into its intermediate frequency. Each of the upstream sub-channels 912 is separated from the signal by a number of tuners 1116. Further processing is performed in the SMTS 310.

Figure 10:
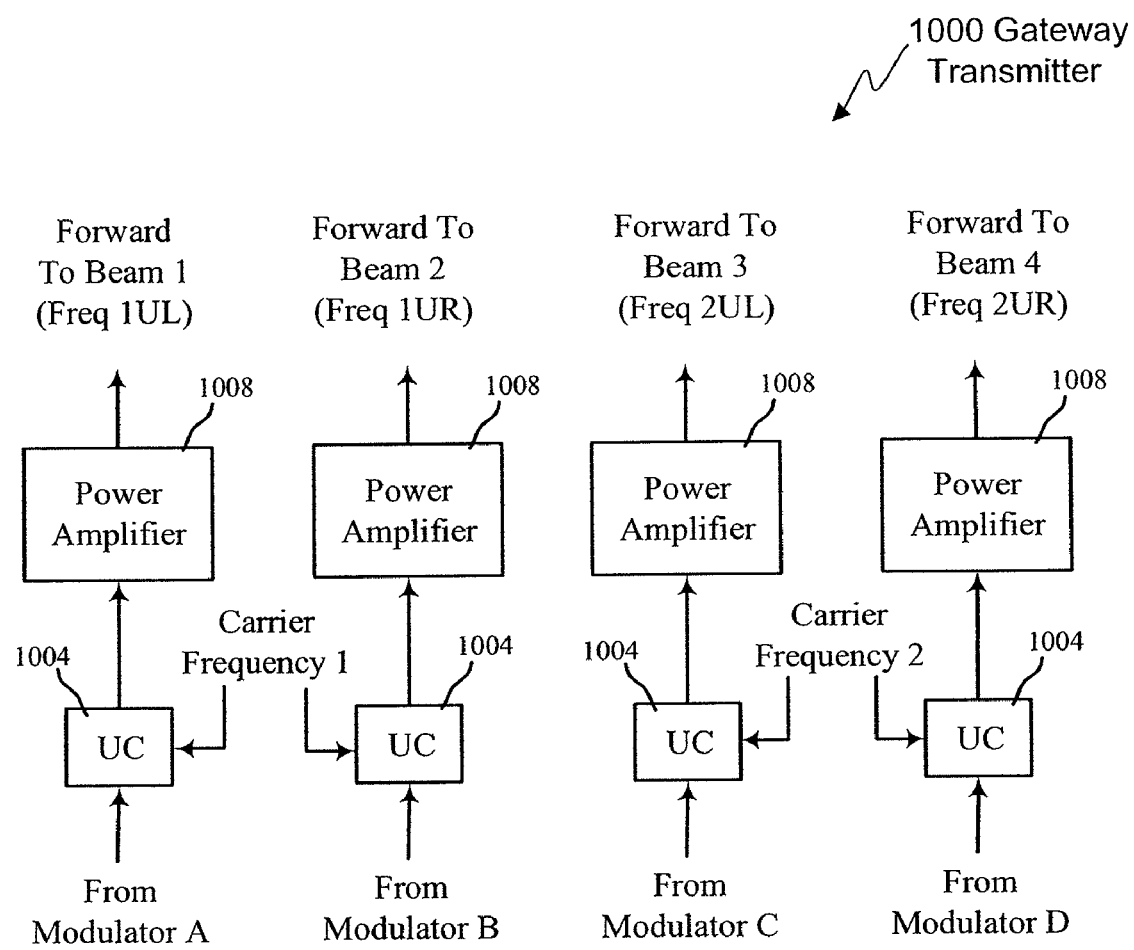
FIG. 10 is a block diagram of a gateway transmitter.

Referring next to FIG. 10, an embodiment of a gateway transmitter 1000 is shown. The downstream channels 800 are received at their intermediate frequencies from the SMTS 310. With separate pathways, each downstream channel 800 is up-converted 1004 using two different carrier frequencies. A power amplifier 1008 increases the amplitude of the forward channel 900 before coupling to the antenna 110. The antenna 110 polarizes the separate signals to keep the four forward channels 800 distinct as they are passed to the satellite 105.

Figure 4:
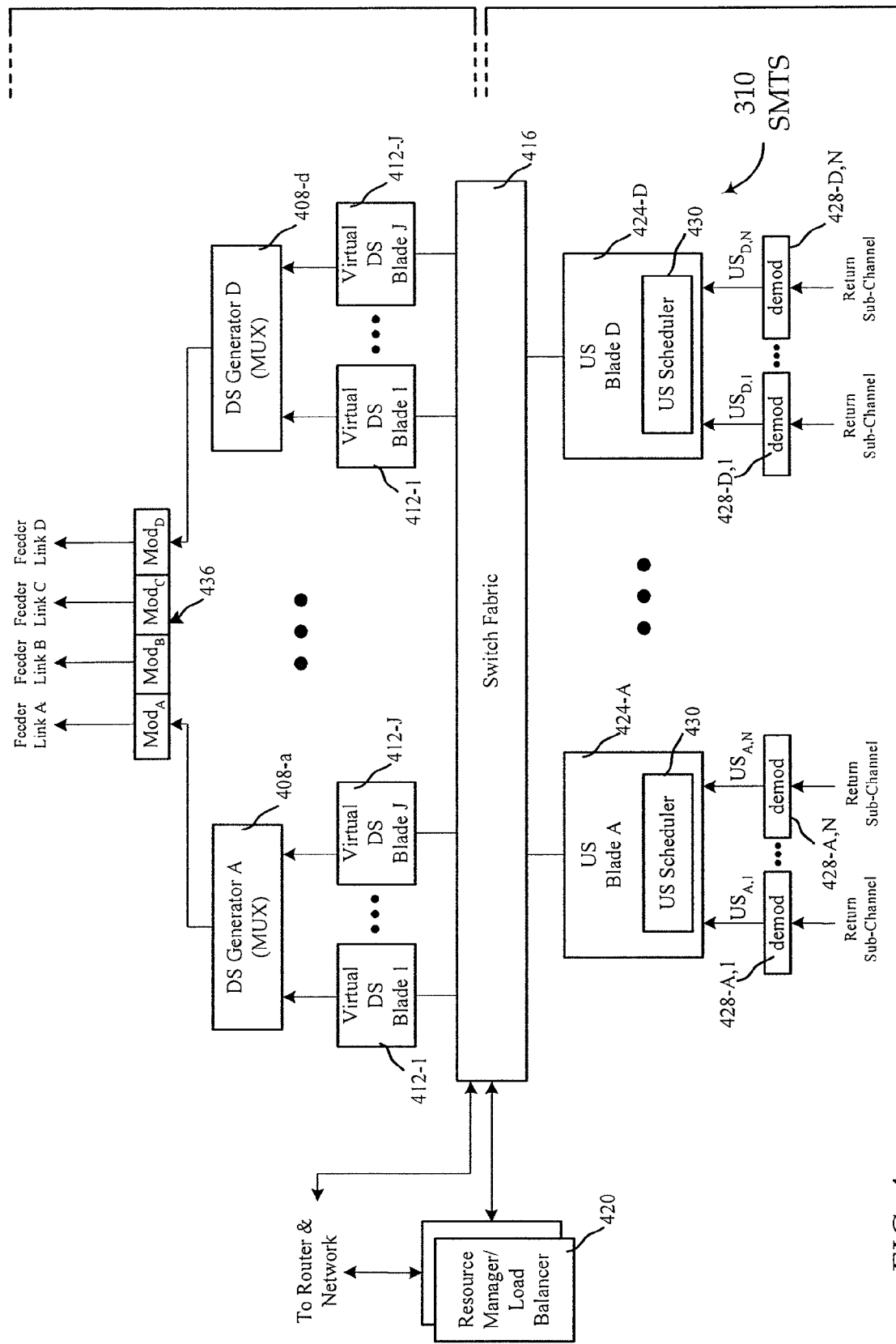
FIG. 4 is a block diagram of a control system.

With reference to FIG. 4, an embodiment of a SMTS 310 is shown in block diagram form. Baseband processing is done for the inbound and outbound links 135, 140 by a number of geographically separated gateways 115. Each SMTS 310 is generally divided into two sections, specifically, the downstream portion 305 to send information to the satellite 105 and the upstream portion 315 to receive information from the satellite 105.

The downstream portion 305 takes information from the switching fabric 416 through a number of downstream (DS) blades 412. The DS blades 412 are divided among a number of downstream generators 408. This embodiment includes four downstream generators 408, with one for each of the downstream channels 800. For example, this embodiment uses four separate 500 MHz spectrum ranges having different frequencies and/or polarizations. A four-color modulator 436 has a modulator for each respective DS generator 408. The modulated signals are coupled to the transmitter portion 1000 of the transceiver 305 at an intermediate frequency. Each of the four downstream generators 408 in this embodiment has J virtual DS blades 412.

The upstream portion 315 of the SMTS 310 receives and processes information from the satellite 105 in the baseband intermediate frequency. After the receiver portion 1100 of the transceiver 305 produces all the sub-channels 912 for the four separate baseband upstream signals, each sub-channel 912 is coupled to a different demodulator 428. Some embodiments could include a switch before the demodulators 428 to allow any return link sub-channel 912 to go to any demodulator 428 to allow dynamic reassignment between the four return channels 908. A number of demodulators are dedicated to an upstream (US) blade 424.

The US blades 424 serve to recover the information received from the satellite 105 before providing it to the switching fabric 416. The US scheduler 430 on each US blade 424 serves to schedule use of the return channel 900 for each subscriber terminal 130. Future needs for the subscriber terminals 130 of a particular return channel 900 can be assessed and bandwidth/latency adjusted accordingly in cooperation with the Resource Manager and Load Balancer (RM/LB) block 420.

The RM/LB block 420 assigns traffic among the US and DS blades. By communication with other RM/LB blocks 420 in other SMTS's 310, each RM/LB block 420 can reassign subscriber terminals 130 and channels 800, 900 to other gateways 115. This reassignment can take place for any number of reasons, for example, lack of resources and/or loading concerns. In this embodiment, the decisions are done in a distributed fashion among the RM/LB blocks 420, but other embodiments could have decisions made by one master MR/LB block or at some other central decision-making authority. Reassignment of subscriber terminals 130 could use overlapping service spot beams 205, for example.

Figure 5:
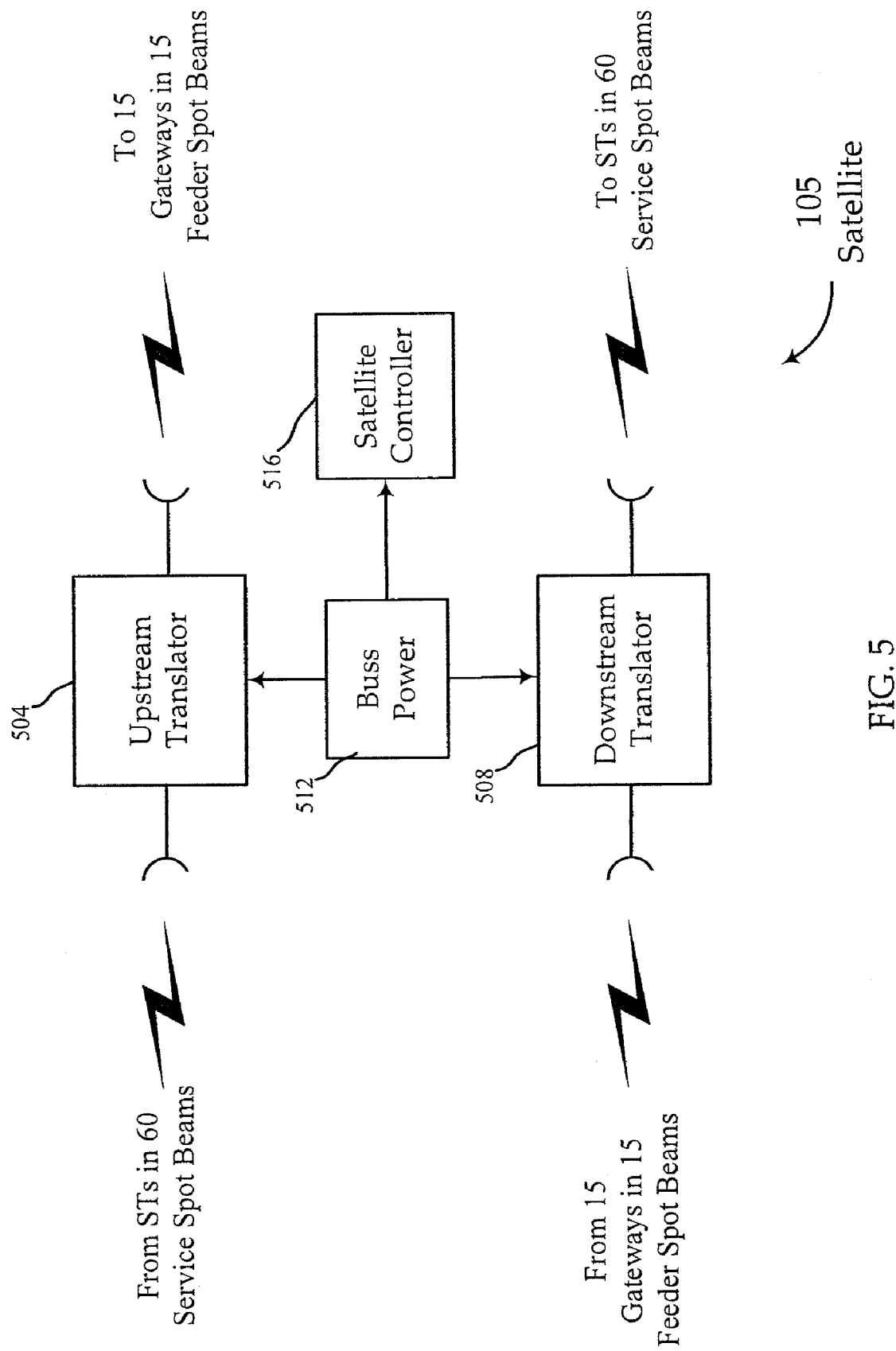
FIG. 5 is a block diagram of communication and control elements of a satellite relay.

Referring next to FIG. 5, an embodiment of a satellite 105 is shown in block diagram form. The satellite 105 in this embodiment communicates with fifteen gateways 115 and all STs 130 using sixty feeder and service spot beams 225, 205. Other embodiments could use more or less gateways/spot beams. Bus power 512 is supplied using a power source such as chemical fuel, nuclear fuel and/or solar energy. A satellite controller 516 is used to maintain attitude and otherwise control the satellite 105. Software updates to the satellite 105 can be uploaded from the gateway 115 and performed by the satellite controller 516.

Information passes in two directions through the satellite 105. A downstream translator 508 receives information from the fifteen gateways 115 for relay to subscriber terminals 130 using sixty service spot beams 205. An upstream translator 504 receives information from the subscriber terminals 130 occupying the sixty spot beam areas and relays that information to the fifteen gateways 115. This embodiment of the satellite can switch carrier frequencies in the downstream or upstream processors 508, 504 in a "bent-pipe" configuration, but other embodiments could do baseband switching between the various forward and return channels 800, 900. The frequencies and polarization for each spot beam 225, 205 could be programmable or preconfigured.

Figure 6A:
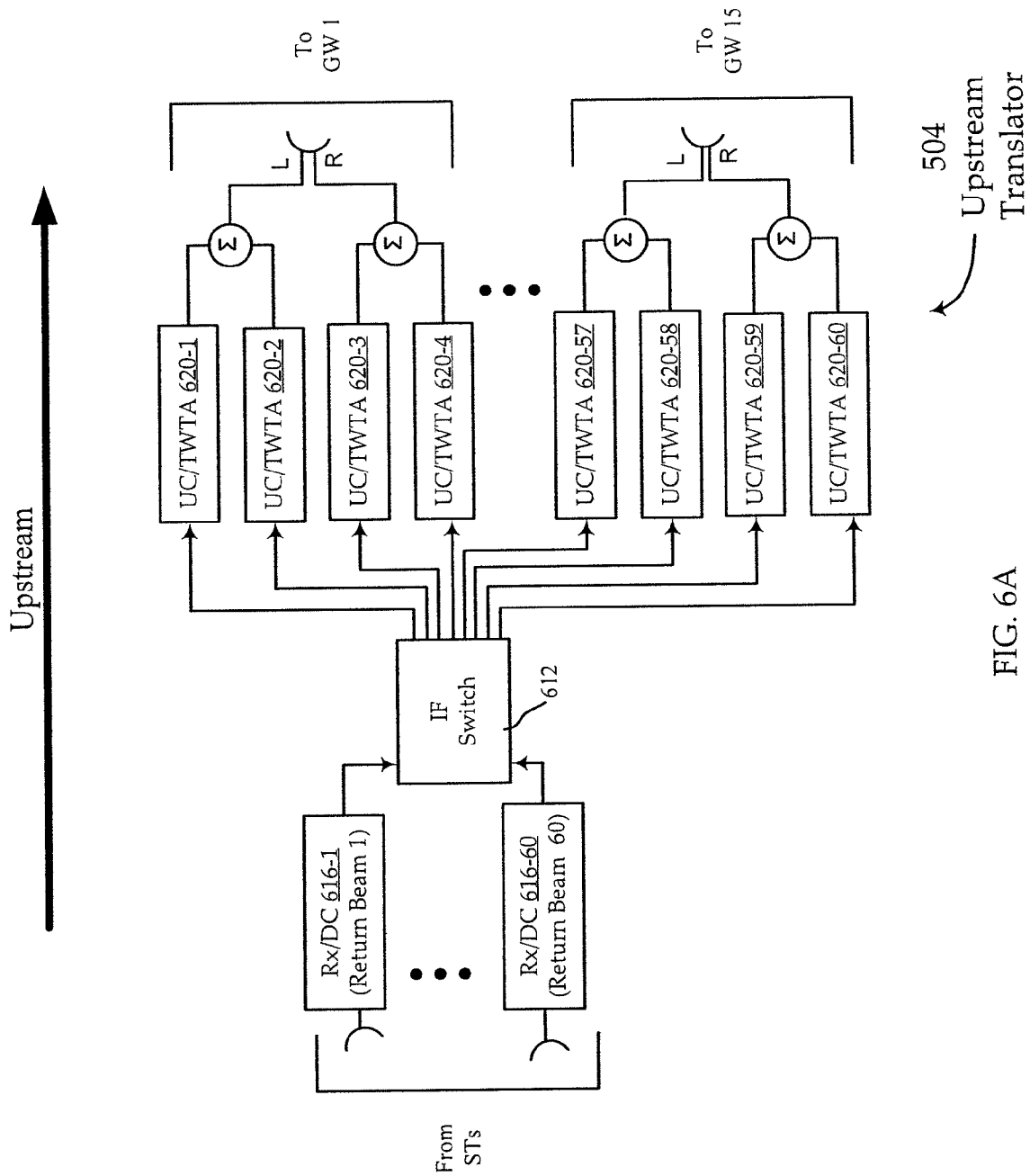
FIGS. 6A and 6B are block diagrams of upstream and downstream translators of FIG. 5.

With reference to FIG. 6A, an embodiment of an upstream translator 504 is shown in block diagram form. A Receiver and Downconverter (Rx/DC) block 616 receives all the return link information for the area defined by a spot beam 205 as an analog signal before conversion to an intermediate frequency (IF). There is a Rx/DC block 616 for each service spot beam area 205. An IF switch 612 routes a particular baseband signal from a Rx/DC block 616 to a particular upstream downlink channel. The upstream downlink channel is filled using an Upconverter and Traveling Wave Tube Amplifier (UC/TWTA) block 620. The frequency and/or polarization can be changed through this process such that each upstream channel passes through the satellite 105 in a bent pipe fashion.

Each gateway 115 has four dedicated UC/TWTA blocks 620 in the upstream translator 504. Two of the four dedicated UC/TWTA blocks 620 operate at a first frequency range and two operate at a second frequency range in this embodiment. Additionally, two use right-hand polarization and two use left-hand polarization. Between the two polarizations and two frequencies, the satellite 105 can communicate with each gateway 115 with four separate upstream downlink channels.

Figure 6B:
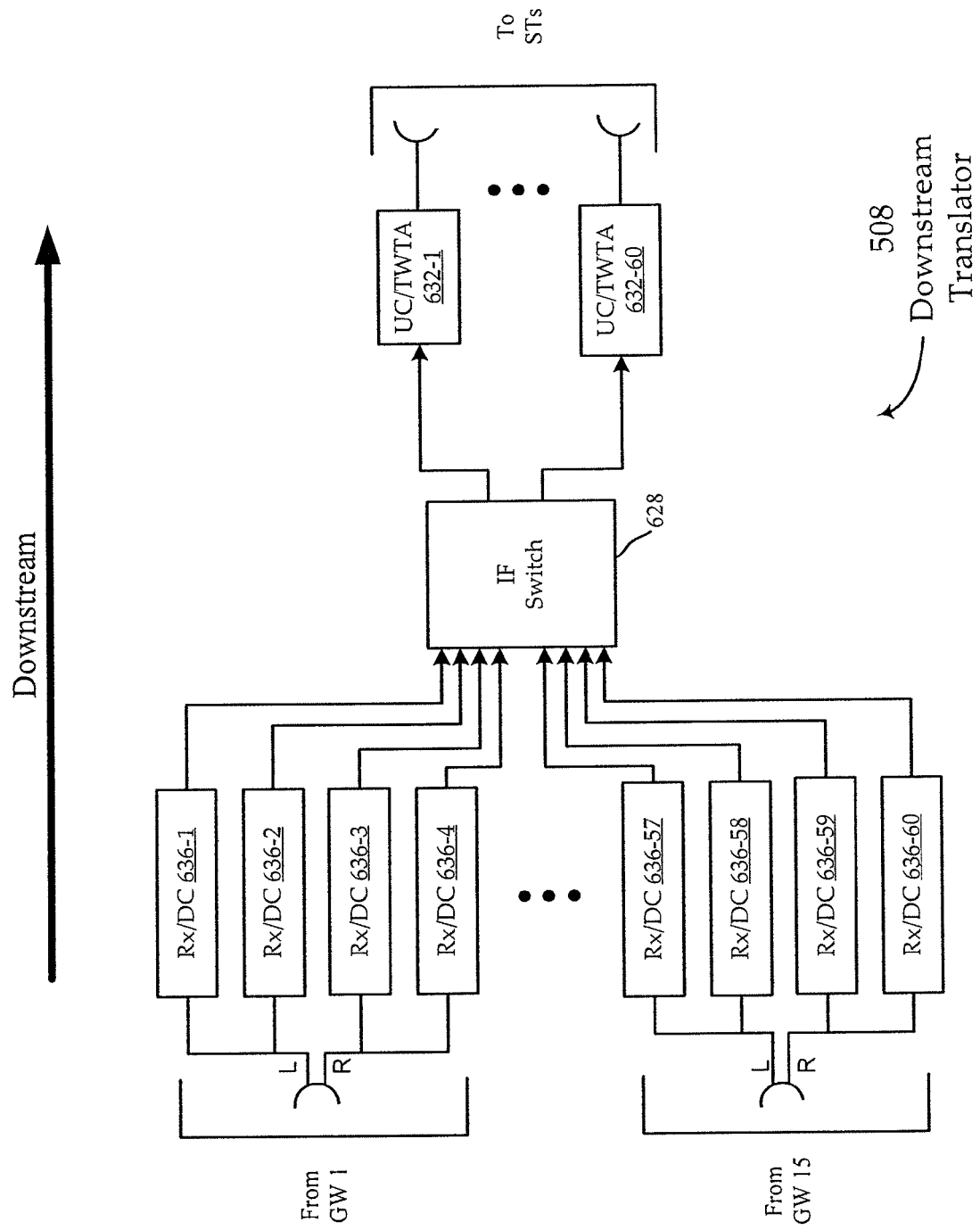

Referring next to FIG. 6B, an embodiment of a downstream translator 508 is shown as a block diagram. Each gateway 115 has four downstream uplink channels to the satellite 105 by use of two frequency ranges and two polarizations. A Rx/DC block 636 takes the analog signal and converts the signal to an intermediate frequency. There is a Rx/DC block 636 for all sixty downstream uplink channels from the fifteen gateways 115. The IF switch 612 connects a particular channel 800 from a gateway 115 to a particular service spot beam 205. Each IF signal from the switch 628 is modulated and amplified with a UC/TWTA block 632. An antenna broadcasts the signal using a spot beam to subscriber terminals 130 that occupy the area of the spot beam. Just as with the upstream translator 504, the downstream translator 508 can change carrier frequency and polarization of a particular downstream channel in a bent-pipe fashion.

Figure 7:
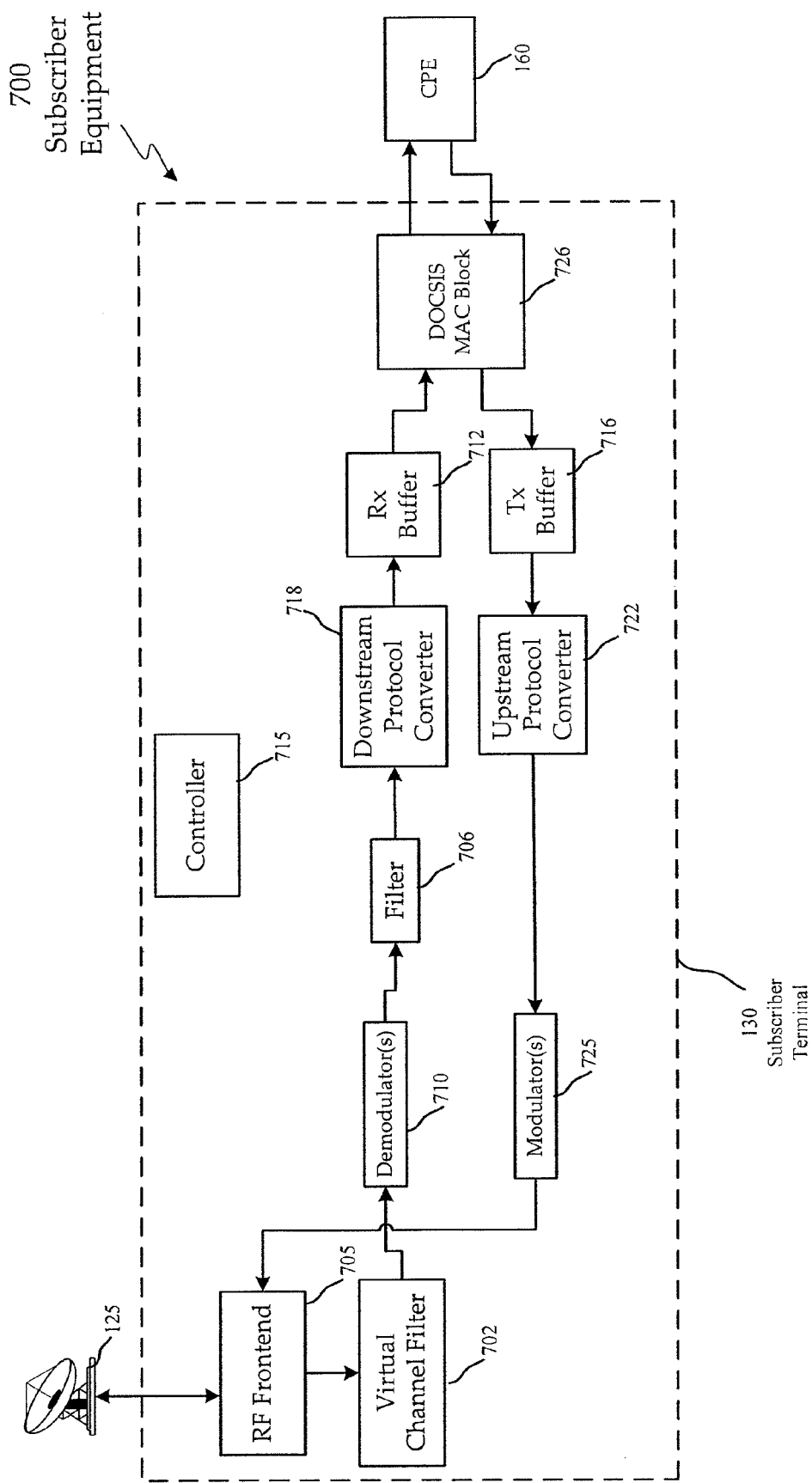
FIG. 7 is a block diagram of a subscriber facility with a subscriber terminal.

FIG. 7 comprises a block diagram illustrating a set of subscriber equipment 700 which may be located at a subscriber location for the reception and transmission of communication signals. Components of this set of subscriber equipment 700 may, for example, comprise the antenna 125, associated subscriber terminal 130 and any consumer premises equipment (CPE) 160, which may be a computer, a network, etc.

An antenna 125 may receive signals from a satellite 105. The antenna 125 may comprise a VSAT antenna, or any of a variety other antenna types (e.g., other parabolic antennas, microstrip antennas, or helical antennas). In some embodiments, the antenna 125 may be configured to dynamically modify its configuration to better receive signals at certain frequency ranges or from certain locations. From the antenna 125, the signals are forwarded (perhaps after some form of processing) to the subscriber terminal 130. The subscriber terminal 130 may include a radio frequency (RF) front end 705, a controller 715, a virtual channel filter 702, a modulator 725, a demodulator 710, a filter 706, a downstream protocol converter 718, an upstream protocol converter 722, a receive (Rx) buffer 712, and a transmit (Tx) buffer 716.

In this embodiment, the RF front end 705 has both transmit and receive functions. The receive function includes amplification of the received signals (e.g., with a low noise amplifier (LNA)). This amplified signal is then downconverted (e.g., using a mixer to combine it with a signal from a local oscillator (LO)). This downconverted signal may be amplified again with the RF front end 705, before processing of the superframe 804 with the virtual channel filter 702. A subset of each superframe 804 is culled from the downstream channel 800 by the virtual channel filter 702, for example, one or more virtual channels 808 are filtered off for further processing.

A variety of modulation and coding techniques may be used at the subscriber terminal 130 for signals received from and transmitted to a satellite. In this embodiment, modulation techniques include BPSK, QPSK, 8PSK, 16APSK, 32PSK. In other embodiments, additional modulation techniques may include ASK, FSK, MFSK, and QAM, as well as a variety of analog techniques. The demodulator 710 may demodulate the down-converted signals, forwarding the demodulated virtual channel 808 to a filter 706 to strip out the data intended for the particular subscriber terminal 130 from other information in the virtual channel 808.

Once the information destined for the particular subscriber terminal 130 is isolated, a downstream protocol converter 718 translates the protocol used for the satellite link into one that the DOCSIS MAC block 726 uses. Alternative embodiments could use a WiMAX MAC block or a combination DOCSIS/WiMAX block. A Rx buffer 712 is used to convert the high-speed received burst into a lower-speed stream that the DOCSIS MAC block 726 can process. The DOCSIS MAC block 726 is a circuit that receives a DOCSIS stream and manages it for the CPE 160. Tasks such as provisioning, bandwidth management, access control, quality of service, etc. are managed by the DOCSIS MAC block 726. The CPE can often interface with the DOCSIS MAC block 726 using Ethernet, WiFi, USB and/or other standard interfaces. In some embodiments, a WiMax block 726 could be used instead of a DOCSIS MAC block 726 to allow use of the WiMax protocol.

It is also worth noting that while a downstream protocol converter 718 and upstream protocol converter 722 may be used to convert received packets to DOCSIS or WiMax compatible frames for processing by a MAC block 726, these converters will not be necessary in many embodiments. For example, in embodiments where DOCSIS or WiMax based components are not used, the protocol used for the satellite link may also be compatible with the MAC block 726 without such conversions, and the converters 718, 722 may therefore be excluded.

Various functions of the subscriber terminal 130 are managed by the controller 715. The controller 715 may oversee a variety of decoding, interleaving, decryption, and unscrambling techniques, as known in the art. The controller may also manage the functions applicable to the signals and exchange of processed data with one or more CPEs 160. The CPE 160 may comprise one or more user terminals, such as personal computers, laptops, or any other computing devices as known in the art.

The controller 715, along with the other components of the subscriber terminal 130, may be implemented in one or more Application Specific Integrated Circuits (ASICs), or a general purpose processor adapted to perform the applicable functions. Alternatively, the functions of the subscriber terminal 130 may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The controller may be programmed to access memory unit (not shown). It may fetch instructions and other data from the memory unit, or write data to the memory-unit.

As noted above, data may also be transmitted from the CPE 160 through the subscriber terminal 130 and up to a satellite 105 in various communication signals. The CPE 160, therefore, may transmit data to DOCSIS MAC block 726 for conversion to the DOCSIS protocol before that protocol is translated with an upstream protocol converter 722. The slow-rate data waits in the Tx buffer 716 until it is burst over the satellite link.

The processed data is then transmitted from the Tx buffer 716 to the modulator 725, where it is modulated using one of the techniques described above. In some embodiments, adaptive or variable coding and modulation techniques may be used in these transmissions. Specifically, different modulation and coding combinations, or "modcodes," may be used for different packets, depending on the signal quality metrics from the antenna 125 to the satellite 105. Other factors, such as network and satellite congestion issues, may be factored into the determination, as well. Signal quality information may be received from the satellite or other sources, and various decisions regarding modcode applicability may be made locally at the controller, or remotely. The RF frontend 705 may then amplify and upconvert the modulated signals for transmission through the antenna 125 to the satellite.

Herein follows a description of a specific aspect of the invention

Web/Bulk Transfer Pre-Allocation

Both web-triggered pre-allocation and bulk transfer are considered "pre-allocation". In the web-triggered case, the SMTS scheduler is granting in a speculative manner based upon the arrival of a real request. In the bulk transfer case, the scheduler is pre-allocating in a measured manner, seeking to match the upstream grant rate with the upstream bulk transfer need.

Web-Triggered Pre-Allocation Overview

When the upstream is lightly loaded, the excess bandwidth can be speculatively pre-allocated to active users. This will speed up the user's web-browsing responsiveness using bandwidth that would otherwise go unused. As the loading increases, web triggered pre-allocation will be disabled by the SMTS. This described later as "Load-dependent Web Pre-allocation".

Web triggered pre-allocation uses a web signature to identify HTTP sessions and subsequently engages pre-allocation. Grants are always made in pairs (subject to grant mini-slot limitations). The first grant is based upon a real request and the second is a speculative grant based upon paQuanta.

Ideally, in an MTD system, there will be two (concatenated) frames at the SM. One frame is in the HWQ and the other in the SWQ. When two grants arrive (real grant followed by a speculative grant), if the second grant is guess correctly, the output queues will drain. When this occurs, the next frame that arrives to the HWQ will generate a request in the random channel. To reduce this random channel usage, a Phantom Packet (described in section 3.4.5.4.2) is inserted just after the S-HoQ frame to cause a piggybacked request.

Bulk Transfer Overview

A characteristic of any DAMA based MAC protocol is one frame exchange per round-trip-time (RTT). This limits the upstream rate to:

$$R_U = \frac{|\text{Frame}| \times 8}{RTT} \quad \text{Equation 1}$$

Upstream PHY configuration limits maximum upstream transmission size to be in the neighborhood of 4K bytes in a specific design. If a user is engaging in an FTP transfer in the upstream, with a 1500 byte packet size, this will cause XTP to send one concatenated frame of size 3000 bytes per round trip time (4.5K bytes would exceed the concatenation threshold). Our round trip times for MTD-DAMA typically are between 600 and 650 milliseconds. This results in a throughput of approximately 38 Kb/s.

Surfbeam using DAMA will need to be able to achieve an upstream throughput of 512 Kb/s for bulk transfers and therefore modifications will need to be made to DAMA to allow this.

Bulk Transfer over DAMA (BToDAMA) leverages ideas already implemented in Doc. These ideas are client driven pre-allocation, protocol identification using a signature, and Phantom Packet ($P^2$) insertion. BToDAMA also introduces a greedy algorithm for increasing the upstream rate to match either the CoS rate or the lowest rate seen in the WAN.

BToDAMA assumes the basic DAMA mechanisms are in play, those being piggybacking requests and granting bandwidth once per RTT. BToDAMA uses a unified proprietary TLV (pTLV) which seeks to communicate to the scheduler that Bulk Transfer (BT) has been identified and what additional grants are desired. As in Pre-allocation v2, the pTLV does not supersede the hardware generated piggybacked request, nor is there a tight timing relationship between the pTLV and hardware generated piggybacked requests.

After a BT is identified, the upstream rate needs to be set such that the terminals CoS rate can be realized while at the same time minimizing bandwidth waste. This involves increasing the upstream rate in a greedy, opportunistic manner until either the CoS rate is achieved, the scheduler has no more bandwidth to assign, or that any additional upstream bandwidth will go wasted due to a bottleneck further down the path.

Simultaneous Web and Bulk Traffic

When a CPE (or network of CPEs) behind a single SM is performing both a BT upload and webpage download, we need to request the maximum (CoS) rate. In order to do this, we have a mechanism that overrides the web sensing algorithm and allows the modem to go into bulk mode. This mechanism counts the number of packets over 1000 bytes (after appending the MAC header and prior to concatenation) in a sliding window of seconds (currently 10). If there are more than a threshold (currently 10) in this period, the SM will force itself out of WEB mode and move to BULK. Whenever there are less packets than the threshold, the SM acts as above.

The Proprietary TLV

The proprietary TLV (pTLV) will take the following conceptual form.

```
struct UnifiedpTLV {
    type
    length
    application
    paQuanta
    paMultiplier
}
```

The application field identifies the application state. It takes the values NULL, WEB, and BULK. This field ought to be two bits in length. If a particular application is disabled or if no application has been identified, then the application field will be set to NULL. The paQuanta field identifies the pre-allocation grant size in units of the minimum grant size in bytes (ie, 138-bytes). This field ought to be six bits in length. The paMultiplier indicates the number of individual grants of size paQuanta mini-slots that the SMTS scheduler must contiguously assign (or as best as can be done, using grants pending). This field ought to be eight bits in length.

Functionality at the SMTS

When a request is received, either via a request channel or via a piggybacked request, the SMTS scheduler should honor this request (standard DAMA behavior) and then provide another grant or grants, within the same MAP if possible. For either pre-allocation application, the action at the SMTS scheduler is the same. The SMTS scheduler must allocate paMultiplier grants of size paQuanta mini-slots. If the scheduler cannot allocate the entire number of grants, it must assert "Grants Pending" and assign the remainder in the next MAP interval(s).

The SMTS will need to maintain state for each registered SM. The state that it needs to maintain is just what is contained in the pTLV, namely the identified application (NULL, BULK, or WEB), the current pre-allocation amount (paQuanta, measured in mini-slots), and the paMultiplier.

Each time a pTLV is received, the state table is updated. There should also be an expiry value. Each time a pTLV is received, this state table is updated and an expiry value is updated as well. If no pTLV is received for some time then the state table for this SM should be purged. This will help in garbage collection. The expiry should be on the order of half minutes.

Updating the state table and generating pre-allocation grants are separate. There is no timing relationship between the two. The state table is updated whenever a pTLV is received. A speculative grant is given each time a real request arrives and the state table indicates that the SM is requesting pre-allocation. Because of this, there may be a very small lag between what <paQuanta, paMultiplier> value the scheduler is using and what this value is about to change to (i.e. updated value). So, for instance, if a concatenated packet arrives with a piggybacked request and an updated pTLV, the request will most likely be considered first and the pre-allocation grant made based upon the values in the state table without this latest pTLV update. The pTLV will be used to update the state table once the frame emerges from the Upstream Post Processor block, which will most likely be after the piggybacked request is processed. Attempting to make a tight timing relationship between requests and pTLV updates is very messy and perhaps not possible.

Web-Only Credit-Borrowing

The standard Best Effort algorithm in the SMTS has a "credit-borrowing" feature to compliment its Deficit Round-Robin (DRR) algorithm which allows a service flow to keep left-over credits from a previous grant for that flow. It aids in allowing grants to get serviced quicker and avoids excessive looping in the algorithm. This feature is only applied to grants whose requests are made via a piggy-back request, thus signifying that there is backlog at the SM. Random-channel request grants start out with a credit value of zero.

In the DAMA implementation, modifications are made to this algorithm such that this credit borrowing feature will only be applied to flows identified as Web. All other requests will start with a credit value of zero. This will aid web flows that perform piggy-back requests and give a slight priority in service over bulk (piggy-back or otherwise) or random-channel (assumed non-backlogged) requests.

Load-Dependent Web Pre-Allocation

Since web pre-allocation is designed to use excess available channel bandwidth, it is desirable to disable it once the channel becomes congested. This requires a reliable congestion metric. One such metric is the measure of the percentage of map mini-slots that are contention slots. This is done by defining a timed window (provisioned) over which to accumulate total map mini-slots throughout the window and total contention slots throughout the window. Also provisioned is a threshold value which represents the percentage of contention that constitutes congestion for the channel. At the expiration of each window, the percentage of contention space is computed by dividing the accumulated contention slots by the total map minislots for the window and stored. The accumulators are then cleared for the next window. At the time of a bandwidth request (either random channel or piggyback) the percentage is checked and if it falls below the threshold, pre-allocation is disabled for the duration of the request. If above the threshold, web pre-allocation is allowed. This algorithm does NOT apply to bulk transfer pre-allocation.

Application State Machine

Figure 14:
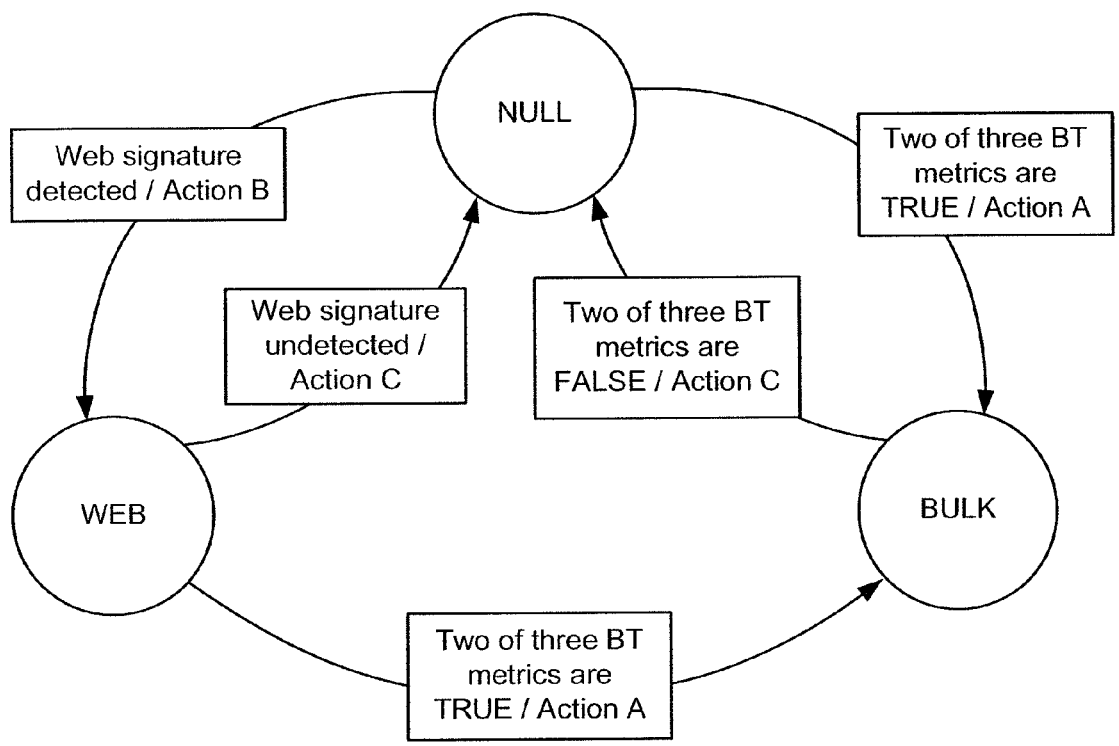
FIG. 14 is a diagram of a state machine according to the invention.

Referring to FIG. 14, the Application State Machine (ASM) provides a means of knowing modem state with respect to the flavor of pre-allocation. When a bulk transfer is detected, the ASM transitions to the BULK state, regardless of the current state. When in the NULL state, if either web activity is detected or bulk transfer, then the ASM transitions to the appropriate state. The SM will always signal using the ASM. In cases where the channel is congested, the SMTS will ignore WEB preallocation. The SMTS will always grant BULK preallocation requests, unless it is manually disabled.

Whenever the modem detects a new webpage download session, the ASM moves to WEB state and updates the pTLV paQuanta using the web quanta (The paMultiplier field will be set to one). If there are several seconds in which no new triggering events occur, the ASM drops out of WEB and moves to BULK or NULL, depending on the state of the BULK metrics.

Whenever the satellite modem detects traffic accessing ports associated with web queries, such as port 80, a 5 second timer is started (or restarted if already running). Until this timer runs out (i.e. it has been 5 seconds since the last web query), the SM will request web pre-allocation, regardless of bulk metrics. When the timer runs out, the SM will move into whatever state the current bulk metrics indicate (either BULK or NULL).

Bulk Transfer Detect

A bulk transfer is detected using three metrics. When any two of this metrics meet certain criterion, the bulk transfer is declared, the ASM transitions to the BULK state, and the pTLV is populated according to the prescriptions of bulk transfer Bulk Transfer Rate Metric—Metric 1

A windowed arrival rate is generated by measuring the arrival rate to the SWQ. This rate should be measured in b/s, averaged over a configurable window.

If the windowed rate metric, $M_1$, exceeds 30 Kb/s, then the indicator $I_1$ is set to TRUE.

Due to the fluctuation in the arrival rate due to the PEP end-to-end flow control, this rate metric may not be a good indicator after the bulk transfer is in steady-state, but will trigger almost immediately when entering bulk.

Bulk Transfer Backlog Metric—Metric 2

An average byte backlog in the HWQ is generated by recording the byte backlog in the HWQ upon dumping a (concatenated) frame from the SWQ to the HWQ. The byte backlog must be measured prior to the dump. This metric must be a sliding window and therefore the measured backlogs must be stored in a ring buffer. The ring buffer must be accumulated and then divided to get the average. For this reason it is advisable that the size of the ring buffer be a power of two, such that the division is simply a right shift. The size of the ring buffer, $S_{RB-2}$, is a parameter of experimentation, however for starters it should be 8. This average byte backlog forms $M_2$. When $M_2$ exceeds threshold two ($T_2$), the indicator for Metric 2, $I_2$, is set to TRUE.

$$M_2 = \left(\frac{\sum \text{ring\_buffer}(i)}{i}\right) >> \log_2 S_{RB-2} \qquad \text{Equation 2}$$

$M_2$ is a good metric at bulk transfer startup, however once steady state is reached, the backlog should become small and therefore this metric may become FALSE.

A value for $T_2$ for initial integration and test is 1500 bytes.

Bulk Transfer Reason Metric—Metric 3

Each time a (concatenated) frame is dumped from the SWQ to the HWQ, the reason for dumping is converted into an integer value and stored in a ring buffer. This ring buffer forms a sliding window average when accumulated and divided by the ring buffer size. This ring buffer is then used to generate and update Metric 3, $M_3$, at each dump instant. The values entered in this ring buffer follow the dump reason given in Table 1.

TABLE 1

| Reason for dumping | Value Entered |
|---|---|
| Grant arrived | 0 |
| UDC timer fired | 0 |
| Phantom Packet dumped | 128 |
| Concat threshold reached | 255 |

Again it is advisable that the ring buffer size ($S_{RB-3}$) be a power of two, such that the division is simply a right shift. The metric $M_3$ is given by Equation 3.

$$M_3 = \left(\frac{\sum \text{ring\_buffer}(i)}{i}\right) >> \log_2 S_{RB-3} \qquad \text{Equation 3}$$

When $M_3$ exceeds $T_3$, the indicator for Metric 3, $I_3$ is set to TRUE. For initial integration $S_{RB-3}$ should be set to 8 and $T_3$ should be set to 80.

Metric 3 should be a good indicator of bulk transfer both at startup and at steady state and therefore will serve as an anchor for identifying bulk transfer throughout the process from startup to steady state.

Event Driven State Machine

Figure 15:
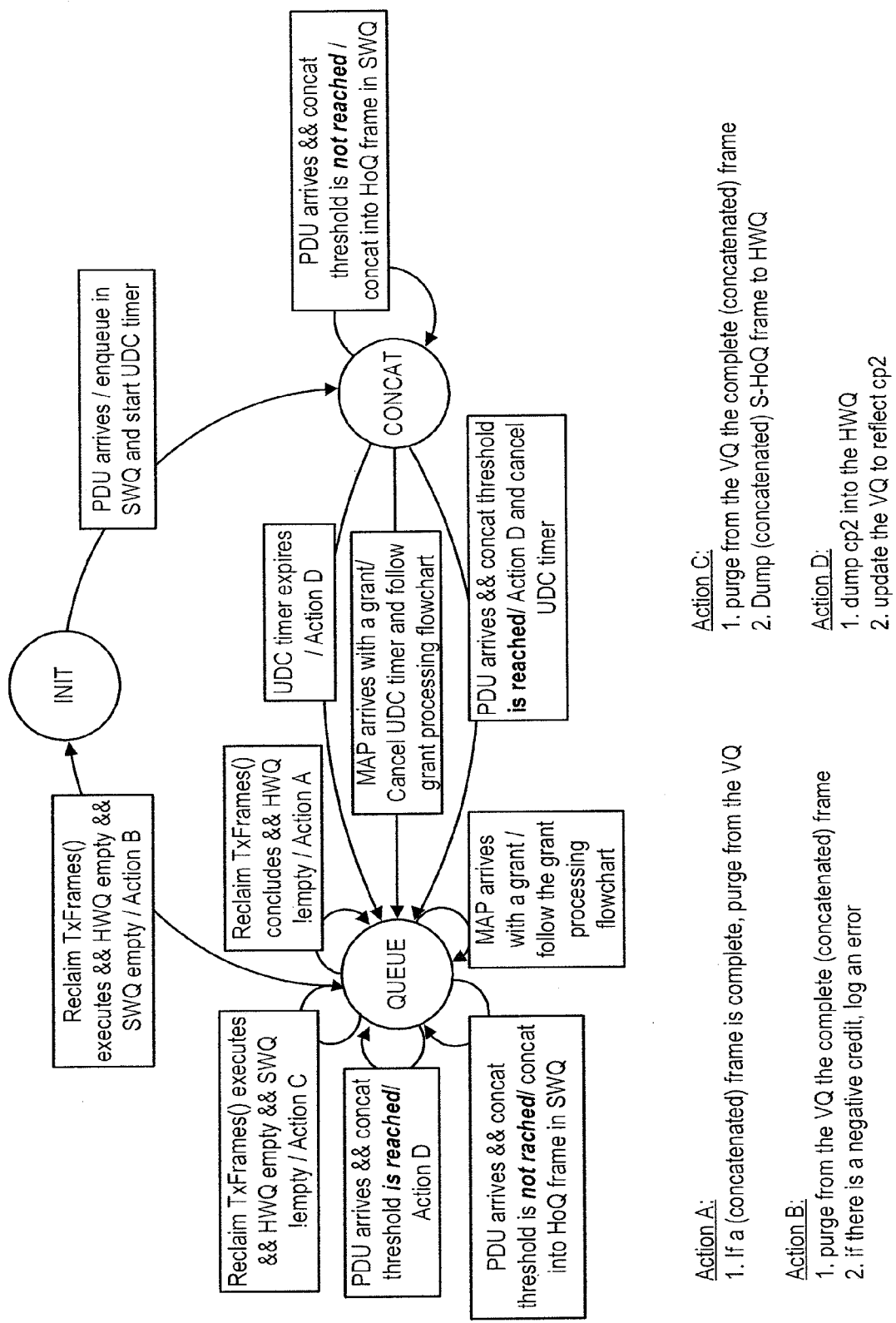
FIG. 15 is a diagram of a state machine with detailed explanations according to the invention.

Referring to FIG. 15, the Event Driven State Machine (ESM) provides instruction for how the SM should act given that an event has occurred. There are four different events.

1. UDC Timer expiry
2. PDU arrival to the SWQ
3. A frame packet descriptor is reclaimed
4. A MAP with grants arrives The ESM is shown in FIG. 15. This state machine supports Web triggered pre-allocation (PAv2), and BToDAMA, as well as other functions.

The (concatenated) frame that sits at the head of the SWQ is referred to as "cp2".

The actions upon UDC timer expiry are straight forward and clear from FIG. 15.

When a PDU arrives, it either is concatenated into an existing frame or becomes the first packet of a new concatenation group.

When a packet descriptor is reclaimed, the SM will take Actions A through C. When the function ReclaimTxFrames( ) is executed, this represents either the conclusion of a transmitted frame or frame fragment. When ReclaimTxFrames( ) is executed, the VQ is updated if a (concatenated) frame is known to have completed transmission. This design makes no assumptions about the nature of ReclaimTxFrames( ). If it is called each time a fragment is transmitted, rather than the entire (concatenated) frame, the state machine of FIG. 15 will still function properly.

When a MAP arrives with a grant, the actions are a bit more involved and are explained hereinafter below.

The Virtual Queue for Software Accounting

A notion of Virtual Queue (VQ) is introduced to serve as a repository for accounting. When a (concatenated) frame is dumped from the SWQ to the HWQ, its size in bytes is logged as an entry in the VQ.

A VQ entry will take the abstract form: <Frame Id>, <Bytes Remaining>, <Fragmented Flag>, <Done Flag>, <HWQ Empty Upon Dump Flag>, <Phantom Packet Flag>, and <Final Frame Flag>. For the purposes of description, an entry takes the following structure:

```
struct VQEntry {
        list_of_frameIds
        bytesRemaining
        fragmentedFlag
        doneFlag
        heudFlag
        p2Flag
        finalFrameFlag
}
```

When a (concatenated) frame is dumped from the SWQ to the HWQ, the VQEntry.bytesRemaining value is the total length (total_len) of the frame if un-concatenated or the concatenated length (concat_len) if the frame is a concatenated frame.

The field VQEntry.list_of_frameIds must be selected to represent the entire frame. When the function ReclaimTxFrames( ) executes, packet descriptors and buffer descriptors are reclaimed for SW use. When a (concatenated) frame is fully transmitted (i.e. no more fragments remain in the HWQ), then the entry at the head of the VQ will be purged. The entry can be purged when all packets in the list_of_frameIds have been reclaimed.

The fragmented flag is set to TRUE if the (concatenated) frame under goes fragmentation over the course of its transmission.

The done flag represents the SW's understanding of progress in the hardware queue.

The heudFlag field is set to TRUE if the (concatenated) frame which is represented by this VQ entry was placed into an empty hardware queue (heud=Hardware queue Empty Upon Dump). This field indicates that not only will this (concatenated) frame submit a request to the random channel, but that it should not have a phantom packet placed in the HWQ behind it.

The p2Flag field is set to TRUE in the VQ entry if the frame which is being dumped to the SWQ is in fact a Phantom Packet ($P^2$). For all other frames, this is set to FALSE.

The finalFrameFlag field is set to TRUE in the VQ entry if the frame being dumped is being dumped due to a grant which is the last grant in a series of grants. Typically this flag is only set for Phantom Packets. This is described in more detail hereinafter below.

The depth of the VQ is driven by the needs of bulk transfer. Assuming that our concatenation limit is ~4000 bytes and that the upstream rate is 512 Kb/s. This corresponds to a XTP transmit window of 62,400 bytes (650 milliseconds*512 Kb/s*1.5/8). If we take this value and divide by 4000, this makes for 16 concatenated frames, therefore the VQ must have at least 16-20 entries.

Grant Processing Flow

When MAPs arrive at the SM, both the hardware and software parse through them. When a MAP arrives, the software must perform pre-processing to make a tuple <grantSizeInBytes, lastGrantFlag>. A grant tuple has lastGrantFlag set to TRUE if it is the last grant allocated to a particular terminal in the MAP and there are no "Grants Pending" for this terminal. Otherwise it is set to FALSE.

Figure 16A:
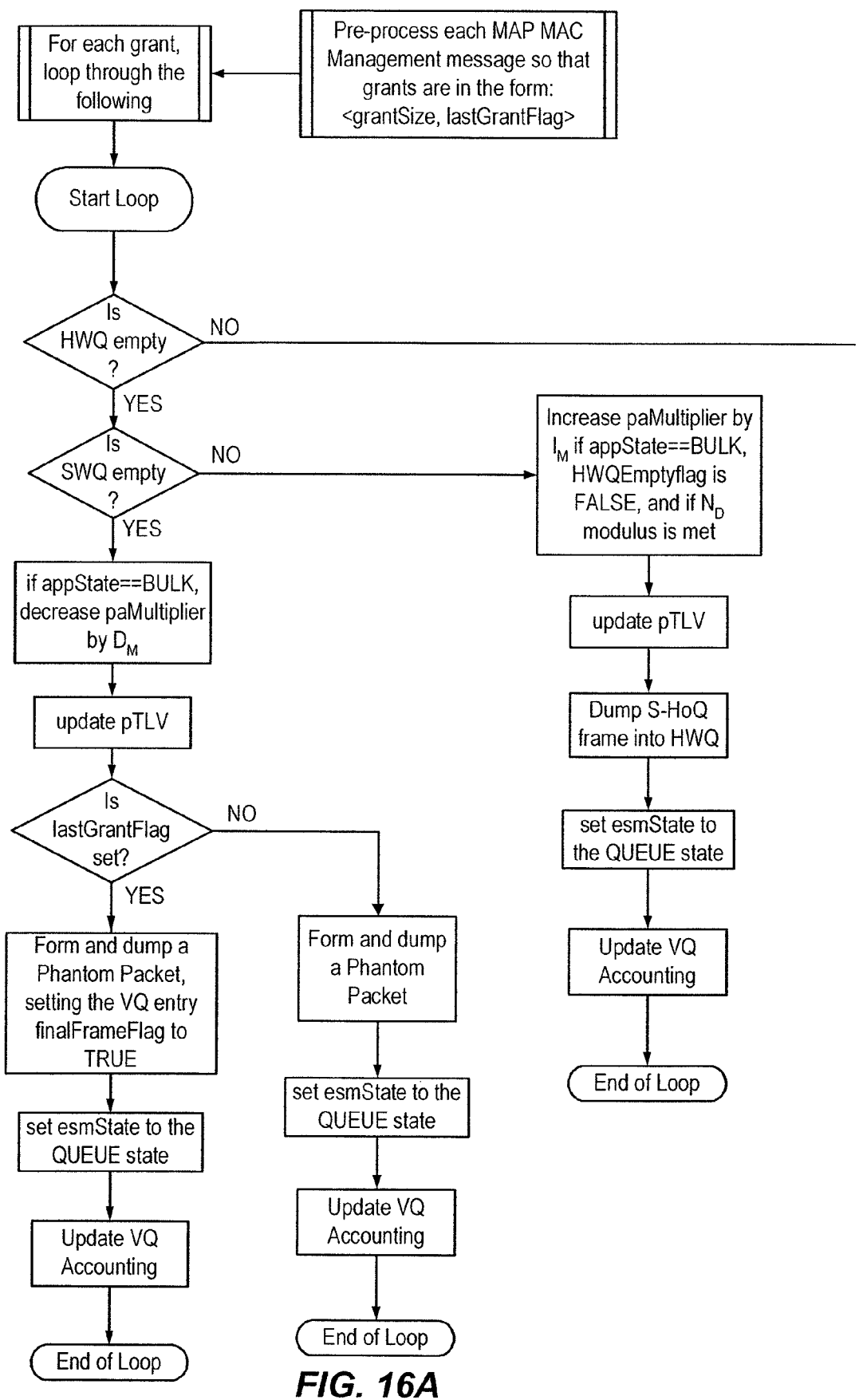
FIGS. 16A-C left to right together are a flow chart according to the invention.
Figure 16B:
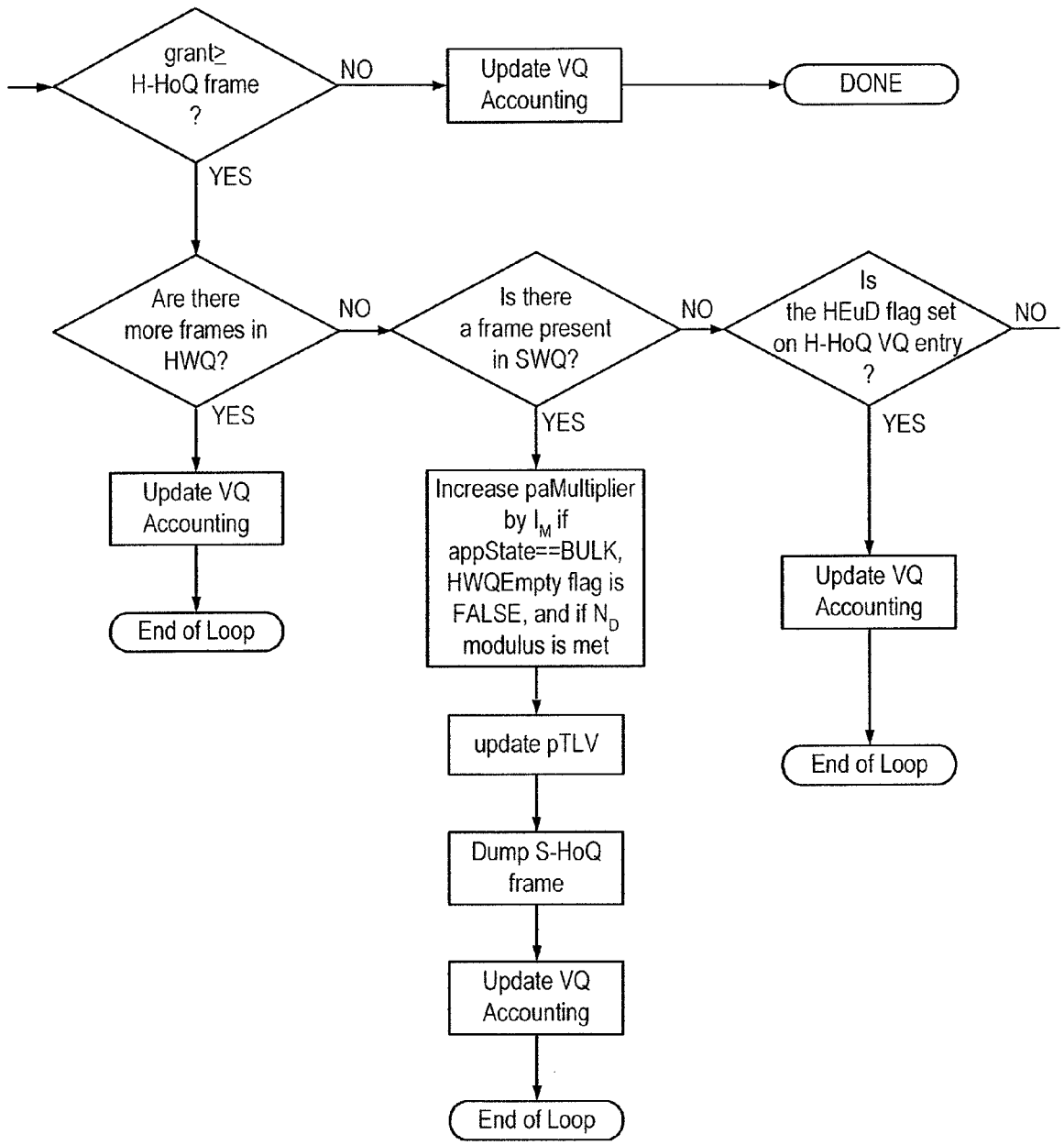
Figure 16C:
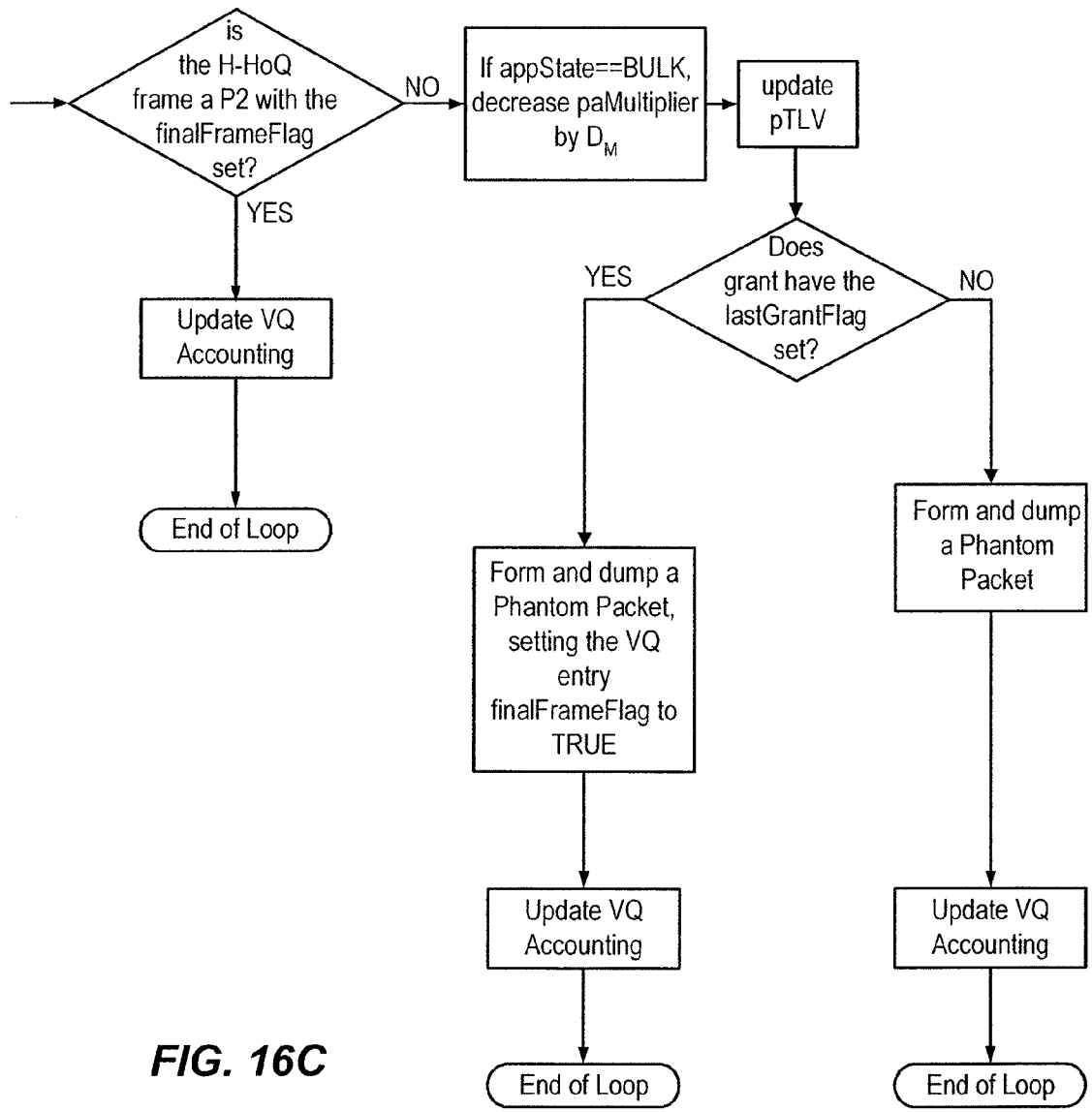

Once all the grants in the MAP that are assigned to a particular SM are arranged as an array of tuples, then the flow chart of FIG. 16A-C can be executed for each grant tuple.

This flow chart supports MTD, PAv2, and BToDAMA.

When a grant arrives, it is inspected to determine if the S-HoQ frame is to be dumped from the SWQ to the HWQ. This is the standard MTD behavior. Pre-allocation (both Web triggered and bulk) adds an additional requirement to limit random channel over usage. This additional requirement is the "Phantom Packet". The Phantom Packet is dumped from the SWQ to the HWQ when an arriving series of grants will not only empty the HWQ but also empty the SWQ. The Phantom Packet ($P^2$) is a frame that will be discarded by the SMTS and will fit into a single turbo code word (33-35 bytes). Phantom Packets will be inserted for all otherwise unusable grants. Phantom Packets will be used in both PAv2 and BToDAMA to keep the DAMA channel active and out of the random channel. If a source goes silent, Phantom Packets will no longer be inserted. The Phantom Packet is an upstream MAC Management message with an ID of 252.

All Phantom Packets must carry the pTLV. All updates to the pTLV should be done before a dump event (either a concatenated frame dump event or a $P^2$ dump event).

Requirements at the Dump Event (Concatenated) frames will be dumped from the SWQ to the HWQ because either a UDC timer expired, a concat threshold was reached, or a grant arrived that triggered the dump.

For all of these cases, if the appState (of the ASM) is set to BULK, the buffer occupancy of the HWQ must be inspected. If the HWQ is empty, then a counter that is SID specific (i.e. global across all frames within the SID) name HWQEmptyCounter is incremented. If the HWQ is not empty, then this global variable remains unchanged. Every $N_D$ dump events, upon the conclusion of the dump, this global variable is inspected. If the HWQEmptyCounter is greater than or equal to a threshold (currently 2), increase the paMultiplier field of the pTLV by $I_M$. Either way, the HWQEmptyCounter is reset to 0.

The increment of the multiplier is meant to increase the upstream grant rate. Ideally, each $N_D$, we want the scheduler to allocate enough grants to carry one additional concatenated frame per RTT. The increment $I_M$ is set based upon the average size of a MTD frame divided by the paQuanta value. To simplify the design, we set $I_M$ to be the concat threshold divided by the paQuanta value. This is not completely accurate as some concatenated frames will be much below the concat threshold, however it eliminates the need for computing the average concatenated frame size on the fly.

Error! Objects Cannot be Created from Editing Field Codes. Equation 4

The paMultiplier has an limit placed on it to increase efficiency. This limit allows the maintaining of a backlog when transferring at near CoS, so that more grants than are required are not requested.

When Phantom Packets are dumped, the opposite effect is desired. Dumping Phantom Packets implies that the queues are empty and that the modem is not using all the grants that are being granted. It is desired that the bandwidth be ramped down somewhat slower than it is ramped up; therefore the decrement value, $D_M$, will be a scaled version of $I_M$.

Error! Objects Cannot be Created from Editing Field Codes. Equation 5

For each and every $P^2$ inserted, paMultiplier shall be decreased by $D_M$. The paMultiplier will never go below zero.

pTLV Generation and Update

The pTLV is populated and added to the EHDR on the leading frame of a concatenated frame, or to every frame if that is easier. The pTLV will change somewhat slowly with time, depending upon the application (BULK faster than WEB). When the application is WEB, the paQuanta value will change with each update to the windowing algorithm (if windowing is used). When the application is BULK, the paQuanta value will remain fixed however the multiplier will change each time a Phantom Packet is inserted, or when the $N_D^{th}$ frame is dumped into a non-empty HWQ.

Web pTLV Generation and Update

When requesting WEB pre-allocation, the SM will use a static value of paQuanta in the range of 1250 to 3864 bytes, converted to quanta units.

Bulk Transfer pTLV Generation and Update

The pTLV will have paQuanta$_{BULK}$ set to a fixed size. For the purposes of initial integration, this size is 276 bytes (converted to quanta units). When sizing paQuanta for BULK, there is a tradeoff between making the grants large (to potentially carry a large frame efficiently) and making them small (in the event that a frame is just slightly larger than paQuanta, the following paQuanta grant is used to inefficiently carry the fragment). It is the author's intuition that smaller grants are better.

In order to achieve speeds closer to CoS on small files, the paMultiplier for BULK pre-allocation will begin at the limit and ramp down (if necessary) to the correct rate. This feature is known as "Jump to CoS." Under normal conditions, this will only wastebandwidth when there is a non-congestion speed limiting factor (e.g., an FTP server limit).

Fair-Sharing and Class-of-Service

Minimum Reserved Rate

The original Best Effort scheduler algorithm in the STMS software has provisions for utilizing the DOCSIS parameter Minimum Reserved Rate. This is defined as follows:

This parameter specifies the minimum rate, in bits/sec, reserved for this Service Flow. The CMTS SHOULD be able to satisfy bandwidth requests for a Service Flow up to its Minimum Reserved Traffic Rate. If less bandwidth than its Minimum Reserved Traffic Rate is requested for a Service Flow, the CMTS MAY reallocate the excess reserved bandwidth for other purposes. The aggregate Minimum Reserved Traffic Rate of all Service Flows MAY exceed the amount of available bandwidth. This value of this parameter is calculated from the byte following the MAC header HCS to the end of the CRC5. If this parameter is omitted, then it defaults to a value of 0 bits/sec (i.e., no bandwidth is reserved for the flow by default).

The Best Effort algorithm utilizes a normalized version of this parameter (in kilobytes) to compute the credits accumulated by a grant in each pass through the DRR algorithm. Therefore, this parameter can be varied according to class-of-service for a flow to give a relative weighting versus other flows on the channel.

It should be noted that the systems, methods, and software discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow chart, a structure diagram, or a block diagram. Although they may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage device" may represent one or more devices for storing data, including read only memory (ROM), random access memory (RAM), magnetic RAM, core memory, magnetic disk storage mediums, optical storage mediums, flash memory devices or other computer readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A method performed at a user terminal of a data over satellite system, the method comprising:
   detecting a state indicating one of (i) bulk transfers involving amounts of data transfer from a user terminal that exceed a preset threshold and (ii) web transfers from the user terminal via an upstream channel;
   determining a packet bandwidth for the state;
   transmitting an indication of the state and a request for preallocation of packet bandwidth that is generated in response to the state;
   receiving a bandwidth allocation indication corresponding to the state and the request for preallocation of packet bandwidth; and
   allocating by a scheduler of the gateway, in accordance with the indication of the state and the request for preallocation of the packet bandwidth, excess bandwidth to the user terminal in response to the indication of the state and the request for preallocation of the packet bandwidth.

2. The method according to claim 1 wherein said transmitting step comprises transmitting a value field.

3. The method according to claim 1, wherein said transmitting step comprises transmitting a type length value (TLV) field.

4. The method according to claim 1, wherein said detecting step includes sensing transfer rate and backlog amount for detecting bulk transfers.

5. The method according to claim 1, wherein said detecting step includes sensing access to ports associated with web queries for detecting at least web transfers.

6. The method according to claim 5, wherein said detecting step includes sensing packet size, transfer rate and backlog amount for detecting bulk transfers.

7. The method according to claim 1, wherein said preallocation determining step includes specifying a preselected preallocation bandwidth for web transfers.

8. The method according to claim 1, wherein said preallocation determining step includes using backlog history to specify preallocation bandwidth for bulk transfers.

9. The method according to claim 1, wherein said allocating step includes dropping web preallocation requests of said user terminal if channel congestion exceeds a threshold.

10. A data over satellite system for preallocation of upstream channel resources, the system comprising:
    a user terminal configured to:
    detect a state indicating one of (i) bulk transfers involving amounts of data transfer from the user terminal that exceed a preset threshold and (ii) web transfers from the user terminal via an upstream channel,
    determine a packet bandwidth for the state and to generate a request for preallocation of the packet bandwidth, and
    transmit an indication of the state and the request for preallocation of the packet bandwidth from the user terminal to a satellite; and
    a gateway having a scheduler configured to allocate, in response to receiving the indication of the state and the request for preallocation of the packet bandwidth excess bandwidth to the user terminal.

11. The system according to claim 10, wherein said transmitter is configured to transmit a value field.

12. The system according to claim 10, wherein said transmitter is configured to transmit a type length value (TLV) field.

13. The system according to claim 10, wherein said detecting operation includes sensing transfer rate and backlog amount to recognize bulk transfers.

14. The system according to claim 10, wherein said detecting operation includes sensing access to ports associated with web queries to recognize at least web transfers.

15. The system according to claim 14, wherein said detecting operation includes sensing packet size, transfer rate and backlog amount to recognize bulk transfers.

16. The system according to claim 10, wherein said preallocation request operation includes specifying a preselected preallocation bandwidth for web transfers.

17. The system according to claim 10, wherein said preallocation request operation includes using backlog history to specify preallocation bandwidth for bulk transfers.

18. The system according to claim 10, wherein said user terminal is configured for a causing an allocating at a gateway of an amount of excess transfer capability to said user terminal in response to the state and the request for preallocation, the allocating including dropping of web preallocation requests of said user terminal if channel congestion exceeds a threshold.

19. A data over satellite system for preallocation of upstream channel resources the system, comprising:
    detecting means at a user terminal for detecting a state indicating one of (i) bulk transfers involving amounts of data transfer from the user terminal that exceed a preset threshold and (ii) web transfers from the user terminal via an upstream channel;
    determining means, communicatively coupled to the detecting means, at the user terminal for determining a packet bandwidth for the state and for generating a request for preallocation of the packet bandwidth;
    transmitting means, communicatively coupled to the determining means, at the user terminal for transmitting an indication of the state and the request for preallocation of the packet bandwidth from the user terminal to a satellite; and means for allocating, in response to receiving the indication of the state and the request for preallocation of the packet bandwidth, excess bandwidth to the user terminal.

20. In a data over satellite system, a method for preallocation of upstream channel resources comprising:
   providing a scheduler at a gateway Satellite Modem Termination System (SMTS) for use in response to a request from a user terminal;
   detecting at the user terminal one of bulk transfers involving large amounts of data transfer from the user terminal and web transfers from the user terminal via the upstream channel; thereupon
   determining requests for preallocation of packet bandwidth; thereafter
   transmitting a state and said requested preallocation of packet bandwidth from the user terminal to the gateway SMTS, and
   allocating at said gateway SMTS excess transfer capability to said user terminal in anticipation of load requirements.

21. In a data over satellite system, a system for preallocation of upstream channel resources comprising:
   a scheduler at a gateway Satellite Modem Termination System (SMTS) for use in response to a request from a user terminal;
   a processor at the user terminal:
   for detecting one of bulk transfers involving large amounts of data transfer from the user terminal and web transfers from the user terminal via the upstream channel; thereupon
   for determining requests for preallocation of packet bandwidth; thereafter
   for transmitting a state and said requested preallocation of packet bandwidth from the user terminal to the gateway SMTS, and
   for allocating at said gateway SMTS excess transfer capability to said user terminal in anticipation of load requirements.

* * * * *